US012743501B2

(12) United States Patent
Vij et al.

(10) Patent No.: US 12,743,501 B2
(45) Date of Patent: Sep. 22, 2026

(54) DEVICE, METHOD, AND SYSTEM TO DETERMINE AN ACCESS TO A TRUSTED EXECUTION ENVIRONMENT

(71) Applicant: Intel Corporation, Santa Clara, CA (US)

(72) Inventors: Mona Vij, Hillsboro, OR (US); Dmitrii Kuvaiskii, Taufkirchen (DE); Bin Xing, Hillsboro, OR (US); Krystof Zmudzinski, Forest Grove, OR (US); Scott Constable, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/084,428

(22) Filed: Dec. 19, 2022

(65) Prior Publication Data

US 2024/0202314 A1 Jun. 20, 2024

(51) Int. Cl.
*G06F 21/53* (2013.01)

(52) U.S. Cl.
CPC ........ *G06F 21/53* (2013.01); *G06F 2221/034* (2013.01)

(58) Field of Classification Search
CPC ........................... G06F 21/53; G06F 2221/034
See application file for complete search history.

(56) References Cited

U.S. PATENT DOCUMENTS

| | | | | |
|---|---|---|---|---|
| 7,698,540 | B2 * | 4/2010 | Norton | G06F 9/485<br>712/228 |
| 8,739,162 | B2 * | 5/2014 | Kim | G06F 11/3423<br>718/100 |
| 9,444,627 | B2 * | 9/2016 | Varadarajan | G09C 1/00 |
| 9,454,389 | B2 * | 9/2016 | Norton | G06F 9/4843 |
| 11,917,067 | B2 * | 2/2024 | Brandt | G06F 9/30025 |
| 11,954,198 | B2 * | 4/2024 | Li | G06F 21/53 |
| 12,561,144 | B1 * | 2/2026 | Liu | G06F 9/3842 |
| 2012/0072734 | A1 * | 3/2012 | Wishman | G06F 21/64<br>713/189 |
| 2016/0134602 | A1 * | 5/2016 | Poornachandran | H04L 63/0428<br>713/171 |

(Continued)

OTHER PUBLICATIONS

Strackx, Raoul, et al., "The Heisenberg Defense: Proactively Defending SGX Enclaves 1 against Page-Table-Based Side-Channel Attacks", <https://arxiv.org/pdf/1712.08519.pdf> Dec. 2017, 16 pgs.

*Primary Examiner* — Gary S Gracia
(74) *Attorney, Agent, or Firm* — Essential Patents Group, LLP

(57) ABSTRACT

Techniques and mechanisms for a processor core to execute an instruction for a hardware (HW) thread to have access to a trusted execution environment (TEE). In an embodiment, execution of the instruction includes determining whether any sibling HW thread, which is currently active, is also currently approved to access the TEE. TEE access by the HW thread is conditioned upon a requirement that any sibling HW thread is either currently inactive, is currently in the same TEE, or is currently approved to enter the TEE. In another embodiment, execution of another instruction, for the HW thread to exit the TEE, includes or otherwise results in system software being conditionally notified of an opportunity to wake up one or more sibling HW threads.

17 Claims, 20 Drawing Sheets

(56) References Cited

U.S. PATENT DOCUMENTS

| | | | | |
|---|---|---|---|---|
| 2019/0311123 | A1* | 10/2019 | Lal | H04L 9/0891 |
| 2020/0409711 | A1* | 12/2020 | Constable | G06F 9/3806 |
| 2021/0110070 | A1* | 4/2021 | Vahldiek-Oberwagner | G06F 3/0673 |
| 2021/0203504 | A1* | 7/2021 | Brandt | G06F 9/30025 |
| 2022/0066809 | A1* | 3/2022 | Liu | G06F 9/45558 |
| 2022/0126210 | A1* | 4/2022 | Kumar | G06F 21/52 |
| 2022/0207187 | A1* | 6/2022 | Constable | G06F 21/75 |
| 2023/0052630 | A1* | 2/2023 | Shifer | G06F 9/30076 |
| 2023/0269076 | A1* | 8/2023 | Brandt | H04L 9/0822<br>713/189 |

* cited by examiner

Prefix 1401(A)

| 7 | 6 | 5 | 4 | 3 | 2 | 1 | 0 |
|---|---|---|---|---|---|---|---|
| 0 | 1 | 0 | 0 | W | R | X | B |

Prefix 1401(A)
Opcode 1403
MOD R/M 1502
MOD 1542 | Reg 1544 | R/M 1546
!=11 | rrr | bbb
Rrrr
Bbbb Prefix 1401(A)
Opcode 1403
MOD R/M 1502
MOD 1542 | Reg 1544 | R/M 1546
11 | rrr | bbb
Rrrr
Bbbb Prefix 1401(A)
Opcode 1403
MOD R/M 1502
MOD 1542 | Reg 1544 | R/M 1546
!=11 | rrr | 100
SIB 1504
SCL 1552 | Index 1554 | Base 1556
| xxx | bbb
Rrrr
Xxxx
Bbbb Prefix 1401(A)
Opcode 1403
MOD R/M 1502
Reg 1544
bbb
Bbbb

DEVICE, METHOD, AND SYSTEM TO DETERMINE AN ACCESS TO A TRUSTED EXECUTION ENVIRONMENT

BACKGROUND

1. Technical Field

This disclosure generally relates to hardware trusted execution environments (TEEs) and more particularly, but not exclusively, to determining how a TEE is to facilitate process execution with one or more hardware threads.

2. Background Art

Hardware privilege levels are often used by a processor to limit memory access by applications running on a device. An operating system typically runs at a higher privilege level and can access all memory of a device, and define memory ranges for other applications. The applications, running a lower privilege level, are restricted to accessing memory within the range defined by the operating system and are not able to access the memory of other applications or the operating system. However, an application frequently has limited protection from a malicious or compromised operating system.

Global Platform (GP) is an industry wide association that publishes specifications for secure deployment and management of applications. Trusted Execution Environment (TEE) is a specification defined by GP that provides a secure environment for storing and processing sensitive information. TEE specification helps Original Equipment Manufacturers (OEMs) and Independent Software Vendors (ISVs) in creating and deploying sensitive applications such as secure transactions, digital rights management, Near-Field Communication (NFC) payments etc.

A TEE is enabled by processor protections that guarantee that code and data loaded inside the TEE is protected from access by code executing outside of the TEE. Thus, the TEE provides an isolated execution environment that prevents, at the hardware level, access of the data and code contained in the TEE from malicious software, including the operating system

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
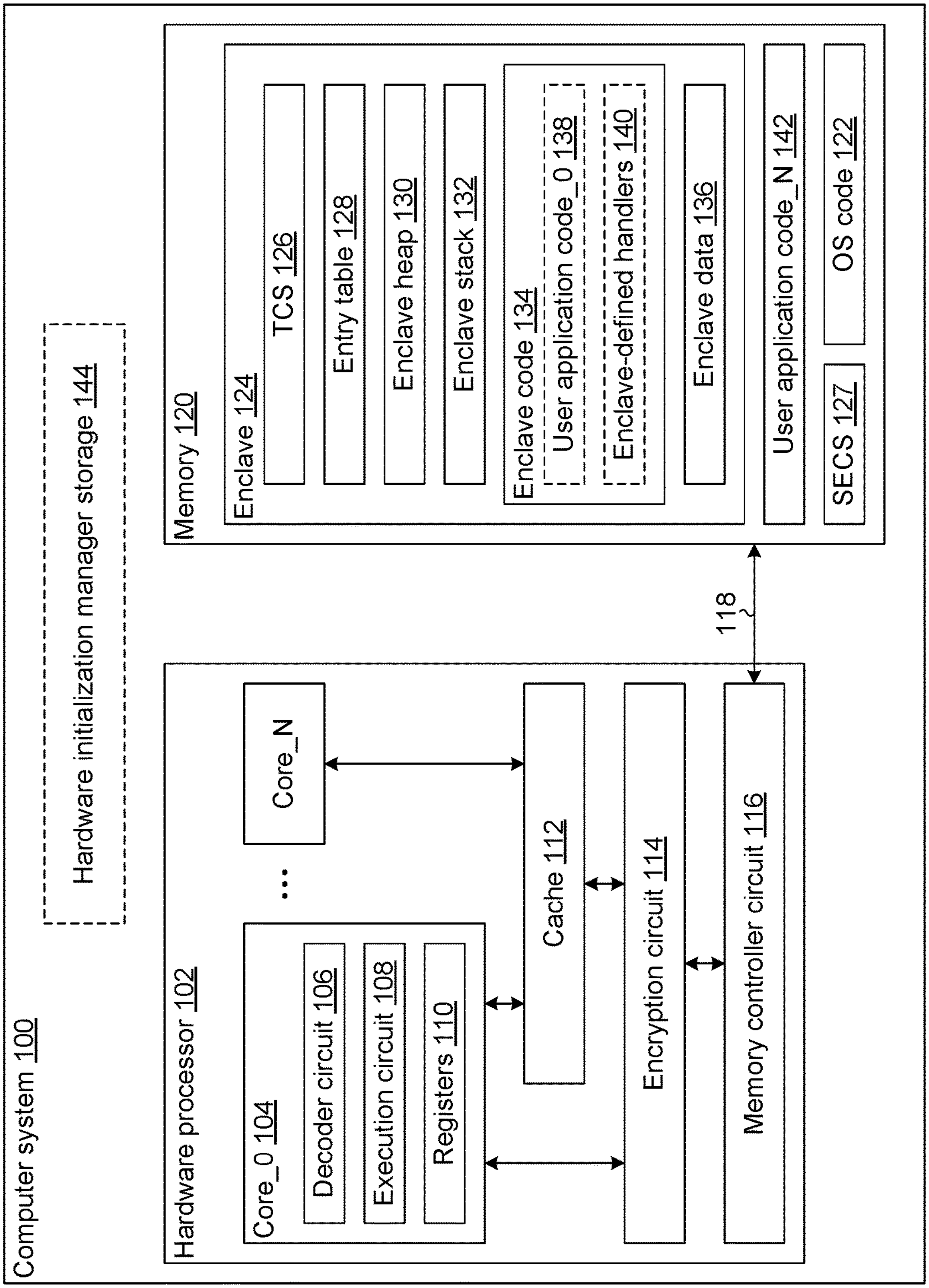
FIG. 1 shows a functional block diagram illustrating features of a computer system to facilitate the execution of simultaneous multithreads according to an embodiment.

Embodiments discussed herein variously provide techniques and mechanisms for a processor core to execute an instruction for a hardware thread to have access to a trusted execution environment (TEE), wherein whether the access is to be is conditioned upon an execution state of one or more other hardware threads of the same processor core. Various embodiments additionally or alternatively change the execution state of one or more hardware threads (or prevent such change) based on an exit of a sibling HW thread from a TEE.

Certain features of various embodiments are described herein with reference to a processor core which comprises multiple hardware (HW) threads, wherein the provisioning of access to a TEE by one such HW thread is conditioned upon a current state of one or more others of the HW threads. As used herein in the context of a given HW thread, "sibling HW thread" (for brevity, "sibling thread" or simply "sibling") refers to another HW thread which is in the same processor core as the HW thread in question.

At a given time during operation of a processor core, a HW thread of the core is in any of multiple possible states. For example, when a HW thread is in a first state (referred to herein as a "sleep" state), the HW thread is unable to process one or more instructions of "software thread"—i.e., a thread of execution. In some instances, an "asleep HW thread"—i.e., one which is in a sleep state—is currently not allocated to any particular thread of execution. A sleep state is also variously referred to as an "inactive state" herein. One type of sleep state is sometimes referred to as an "idle state" or "halt state," for example.

By contrast, when a HW thread is instead in a second state (referred to herein as an "awake" state), the HW thread is able to process one or more instructions of a software thread to which that HW thread has been allocated. For example, an "awake HW thread"—i.e., one which is currently in an awake state—is able to execute a software thread within a particular TEE, or (alternatively) outside of any TEE. An awake state is also variously referred to as an "active state" herein. It is appreciated that, in some embodiments, a HW thread can be in any of various sub-states while in an awake state—e.g., wherein the HW thread is actively executing during one such sub-state, and wherein (to accommodate a process execution by another awake sibling thread) the HW thread is suspended, yielded or otherwise paused during another such sub-state.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including a processor which is configured to selectively provide access to a trusted execution environment (TEE).

Simultaneous multithreading (SMT) is a technique to increase performance of multithreaded and multi-process workloads by multiplexing two or more independent threads of execution on a shared set of computational resources. The Software Guard Extensions (SGX) technology from Intel Corporation of Santa Clara, CA (for example) is an instruction set architecture (ISA) extension which allows to sensitive code and data to be put inside a so-called "SGX enclave"—i.e., a region of memory that is other software including a privileged operating system (OS) process, a privileged hypervisor process, or the like. SGX is one example of a technology which provides a Trusted Execution Environment (TEE) on a SMT-enabled processor such as a central processor unit (CPU)—e.g., wherein multiple threads are able to execute concurrently in an SGX enclave.

In the past few years, various vulnerabilities—such as the LITF (or "Foreshadow") vulnerability—have been identified as posing a risk of an adversarial OS or virtual machine monitor (VMM) being able to infer potentially the entire plaintext contents of an SGX enclave. To mitigate this risk, some processors architectures enable a BIOS to disable SMT at system boot time (where the SMT remains disabled until a next boot cycle). However, such disabling of SMT functionality usually reduces number of available logical processors significantly, which can degrade performance.

To mitigate the exposure of a TEE to malicious agents, while promoting the performance of hardware threads, some embodiments, variously extend or otherwise modify existing TEE instruction circuitry to conditionally provide access to a TEE to a given hardware (HW) thread of a processor core. In some embodiments, a given HW thread of a core is permitted to enter a TEE based on a condition wherein, for any other HW thread of that same core, that other HW thread is currently in a sleep state, or is in that same TEE, or (for example) has a pending approval to enter that same TEE. For example, such entry into the TEE by the given HW thread is prevented (or at least stalled) if, for at least one other HW thread of the core, that other HW thread is awake, and—furthermore—is either outside of any or all TEEs, or is in a different TEE. In one embodiment, one or more other cores—of the same processor, for example, or of another processor—operate independent of whether or how the thread in question is given (or denied) TEE access.

Different embodiments each enforce the following rule: when a given HW thread of a core is executing in a TEE, any other sibling HW thread is either in an idle (or "halted") state, or is executing within the same TEE as that given HW thread. In some embodiments, instruction execution circuitry of a processor core operates to provide a "rendezvous" mechanism whereby, when one HW thread attempts to enter a TEE, that one HW thread must wait until one or more sibling HW threads are each similarly ready to enter the same TEE. Additionally or alternatively, such instruction execution circuitry operates, based on an entry of a thread into a TEE, to automatically signal that one or more sibling HW threads are to be woken (e.g., so that each such sibling HW thread is also to enter that same TEE). Some embodiments thus allow SMT to remain enabled in a BIOS, while (for example) providing customers with an option to shield one or more SGX (or other) enclaves against SMT-related vulnerabilities.

FIG. 1 shows features of a computer system 100 to facilitate the execution of simultaneous multithreads according to an embodiment. The computer system 100 illustrates one example of an embodiment wherein a processor supports the conditional execution of a process in a trusted execution environment (TEE) by a hardware (HW) thread of a processor core. In some embodiments, a first HW thread executes an instruction for entering or exiting a TEE, wherein the execution includes (or otherwise results in) a determination as to whether a second HW thread, which a sibling of the first HW thread, is to exit or enter the TEE.

As shown in FIG. 1, computer system 100 comprises a hardware processor 102 coupled to a memory 120 having an enclave 124. A core may be any hardware processor core, e.g., as an instance of one of cores 1002A, . . . , 1002N in FIG. 10, or of core 1190 in FIG. 11B. Although multiple cores are shown, hardware processor 102 (e.g., socket) may have a single or any plurality of cores (e.g., where N is any positive integer greater than 1). Depicted core_0 104 includes a decoder circuit 106 to decode instructions into decoded instructions and an execution circuit 108 to execute instructions, e.g., to operate on data in registers 110.

Memory access (e.g., store or load) request may be generated by a core, e.g., a memory access request may be generated by execution circuit 108 of core_0 104 (e.g., caused by the execution of an instruction decoded by decoder circuit 106). In certain embodiments, a memory access request is serviced by a cache, e.g., one or more levels of cache 112 in hardware processor 102. Additionally or alternatively (e.g., for a cache miss), memory access request may be serviced by memory separate from a cache, e.g., but not a disk drive.

In certain embodiments, computer system 100 includes an encryption circuit 114 (e.g., that utilizes location independent persistent memory encryption as disclosed herein). In one embodiment, encryption circuit 114 of hardware processor 102 receives a memory access (e.g., store or load) request from one or more of its cores (e.g., from an address generation circuit of execution circuit 108). Encryption circuit may, e.g., for an input of a destination address and text to be encrypted (e.g., plaintext) (e.g., and a key), perform an encryption to generate a ciphertext (e.g., encrypted data). The ciphertext may then be stored in storage, e.g., in memory 120. An encryption circuit may perform a decryption operation, e.g., for a memory load request.

In certain embodiments, computer system 100 includes a memory controller circuit. In one embodiment, memory controller circuit 116 of hardware processor 102 receives an address for a memory access request, e.g., and for a store request also receiving the payload data (e.g., ciphertext) to be stored at the address, and then performs the corresponding access into memory 120, e.g., via one or more memory buses 118. Computer system 100 may also include a coupling to secondary (e.g., external) memory (e.g., not directly accessible by a processor), for example, a disk (or solid state) drive (e.g., storage circuitry 928 in FIG. 9).

In one embodiment, the hardware initialization manager (non-transitory) storage 144 stores hardware initialization manager firmware (e.g., or software). In one embodiment, the hardware initialization manager (non-transitory) storage 144 stores Basic Input/Output System (BIOS) firmware. In another embodiment, the hardware initialization manager (non-transitory) storage 144 stores Unified Extensible Firmware Interface (UEFI) firmware. In certain embodiments (e.g., triggered by the power-on or reboot of a processor), computer system 100 (e.g., core_0 104) executes the hardware initialization manager firmware (e.g., or software) stored in hardware initialization manager (non-transitory) storage 144 to initialize the system 100 for operation, for example, to begin executing an operating system (OS), initialize and test the (e.g., hardware) components of system 100, and/or enabling enclave functionality (e.g., enclave instructions) (e.g., enabling by setting a corresponding field in a control register (e.g., model-specific register (MSR)) of registers 110, e.g., IA32_FEATURE_CONTROL MSR).

Memory 120 may store operating system (OS) code 122 (e.g., supervisor level code, e.g., current privilege level (COUPLE)=0). For example, with the current privilege level stored in a current privilege level (COUPLE) field of a code segment selector register of segment register of registers 110. Memory 120 may store user application code, such as the illustrative user code_0 138 and user code_N 142 shown (e.g., user level code, e.g., COUPLE>0). In the example embodiment shown, user code_0 138 is stored in enclave 124, and user code_N 142 is in a region of memory 120 which is outside of enclave 124. However, in other embodiments (and/or at other times), any of various additional or alternative arrangements of user code are stored each in a respective portion of memory 120.

In an example embodiment, enclave 124 includes a thread control structure (TCS) 126 (e.g., one TCS for each thread), an entry table 128, an enclave heap 130, an enclave stack 132, enclave code 134 (e.g., user application code_0 138 (e.g., a user application) and/or an enclave defined handler 140), enclave data 136 (e.g., to store encrypted data used by user application code_0 138), or any one or combination thereof. In certain embodiments, a secure enclave control structure (SECS) 127 contains meta-data about the enclave which is used by the hardware and cannot be directly accessed by software. For example, a SECS including a field that stores the enclave build measurement value (e.g., MRENCLAVE). In one embodiment, that field is initialized by executing an enclave create (ECREATE) instruction, e.g., and updated by every enclave add (EADD) instruction and enclave extend (EEXTEND) instruction and/or locked by an enclave initialize (EINIT) instruction. In certain embodiments, every enclave contains one or more TCS structures, e.g., per thread of the enclave. For example, with a TCS containing meta-data used by the hardware to save and restore thread specific information when entering/exiting the enclave. In one embodiment, there is only one field (e.g., FLAGS) of a TCS that may be accessed by software (e.g., where this field can only be accessed by debug enclaves). In one embodiment, a flag bit (e.g., DBGOPTIN) allows a single step into the thread associated with the TCS. In certain embodiments, a SECS is created when an ECREATE instruction is executed. In certain embodiments, a TCS can be created using an EADD instruction and/or an (e.g., SGX2) instruction.

In an embodiment, enclave 124 includes one or more pages of an enclave page cache (EPC), e.g., where the EPC is the secure storage used to store enclave pages when they are a part of an executing enclave. In certain embodiments, for an EPC page, hardware performs additional access control checks to restrict access to the page, e.g., after the current page access checks and translations are performed, the hardware checks that the EPC page is accessible to the program currently executing. In one embodiment, generally an EPC page is only accessed by the owner of the executing enclave or an instruction which is setting up an EPC page. In certain embodiments, an EPC is divided into EPC pages, e.g., where an EPC page is 4 KB in size and always aligned on a 4 KB boundary. In certain embodiments, pages in the EPC can either be valid or invalid, e.g., where every valid page in the EPC belongs to one enclave instance. In certain embodiments, the EPC is managed by privileged software (e.g., OS or VMM). Certain embodiments herein of an ISA a set of instructions for adding and removing content to and from the EPC. The EPC may be configured by hardware initialization manager at boot time. In one implementation in which EPC memory is part of system memory (e.g., dynamic random access memory (DRAM)), the contents of the EPC are protected by encryption circuit 114.

Enclave instructions include one or more supervisor-level instructions and/or one or more user-level instructions in some embodiments. For example, one or more supervisor-level instructions include some or all of: an enclave add (EADD) instruction to add an EPC page to an enclave, an enclave block (EBLOCK) instruction to block an EPC page, an enclave create (ECREATE) instruction to create an enclave, a debug enclave read (EDBGRD) instruction to read data from a debug enclave by a debugger, a debug enclave write (EDBGWR) instruction to read data from a debug enclave by a debugger, an enclave extend (EEXTEND) instruction to extend an EPC page measurement, an enclave initialize (EINIT) instruction to initialize an enclave, an enclave load blocked (ELDB) instruction to load an EPC page in a blocked state, an enclave load unblocked (ELDU) instruction to load an EPC page in an unblocked state, an enclave PA (EPA) instruction to add an EPC page to create a version array, an enclave remove (EREMOVE) instruction to remove an EPC page from an enclave, an enclave track (ETRACK) instruction to activate enclave block (EBLOCK) checks, or an enclave write back/invalidate (EWB) instruction to write back and invalidate an EPC page.

Additionally or alternatively, the one or more user-level instructions include some or all of: an enclave enter (EENTER) instruction to enter an enclave, an enclave exit (EEXIT) instruction to exit an enclave, an enclave key (EGETKEY) instruction to create a cryptographic key, an enclave report (EREPORT) instruction to create a cryptographic report, or an enclave resume (ERESUME) instruction to re-enter an enclave. In certain embodiments, each executing thread in the enclave is associated with a thread control structure 126 (TCS), e.g., with each TCS having a 4K-Bytes alignment.

In an embodiment, core_0 104 (for example) comprises multiple hardware threads. Insofar as they are each implemented with respective circuitry of core_0 104, these multiple HW threads are "sibling threads" with respect to each other. In an embodiment, core_0 104 provides controller functionality which facilitates the selective allocation of access, by a given HW thread of core_0 104, to execute a thread of execution in a TEE (such as one which is provided by enclave 124).

In an embodiment, a first HW thread of core_0 104 is operable to execute an instruction to enable the first HW thread to access a TEE, wherein execution of the instruction comprises evaluating a state of execution of a sibling HW thread of core_0 104. The evaluating is one condition of a provisioning of the TEE access requested by the first HW thread. In an illustrative scenario according to one embodiment, a first HW thread of core_0 104 is permitted to enter a TEE which is provided with enclave 124, wherein the permission is based on a condition wherein, for any other HW thread of core_0 104, that other HW thread is currently in an idle state, or is in that same TEE, or (for example) has a pending approval to enter that same TEE. For example, such entry into the TEE by the first HW thread of core_0 104 is prevented (or at least stalled) if, for at least one other HW thread of core_0 104, that other HW thread is awake, and—furthermore—is either outside of any or all TEEs, or is in a different TEE. In one embodiment, the provisioning of any TEE provided by enclave 124 to a given HW thread of core_0 104 is determined independent of whether or how some HW thread of another core (Core_N, for example) is to be provided access to that same TEE, or another TEE.

In some embodiments, a first HW thread of core_0 104 is additionally or alternatively operable to execute an instruction to enable the first HW thread to access a TEE, wherein execution of the instruction conditionally results in some or all other HW threads of core_0 104 being woken (that is, transitioned from a sleep state to an awake state) for entry into the same TEE.

In some embodiments, a first HW thread of core_0 104 is additionally or alternatively operable to execute an instruction to disable access to a TEE by the first HW thread, wherein execution of the instruction includes or otherwise results in the identification of an opportunity to transition one or more sibling HW threads (which are currently idle) each to a respective active state. In one such embodiment, execution of the instruction alternatively prevents the execution of one or more sibling HW threads (if any) in the TEE while the first HW thread continues to execute outside of the TEE.

In some embodiments, a first HW thread of core_0 104 is additionally or alternatively operable to implement a prioritization, with respect to an accessibility to a given TEE, of one HW thread over some or all sibling HW threads.

Figure 2:
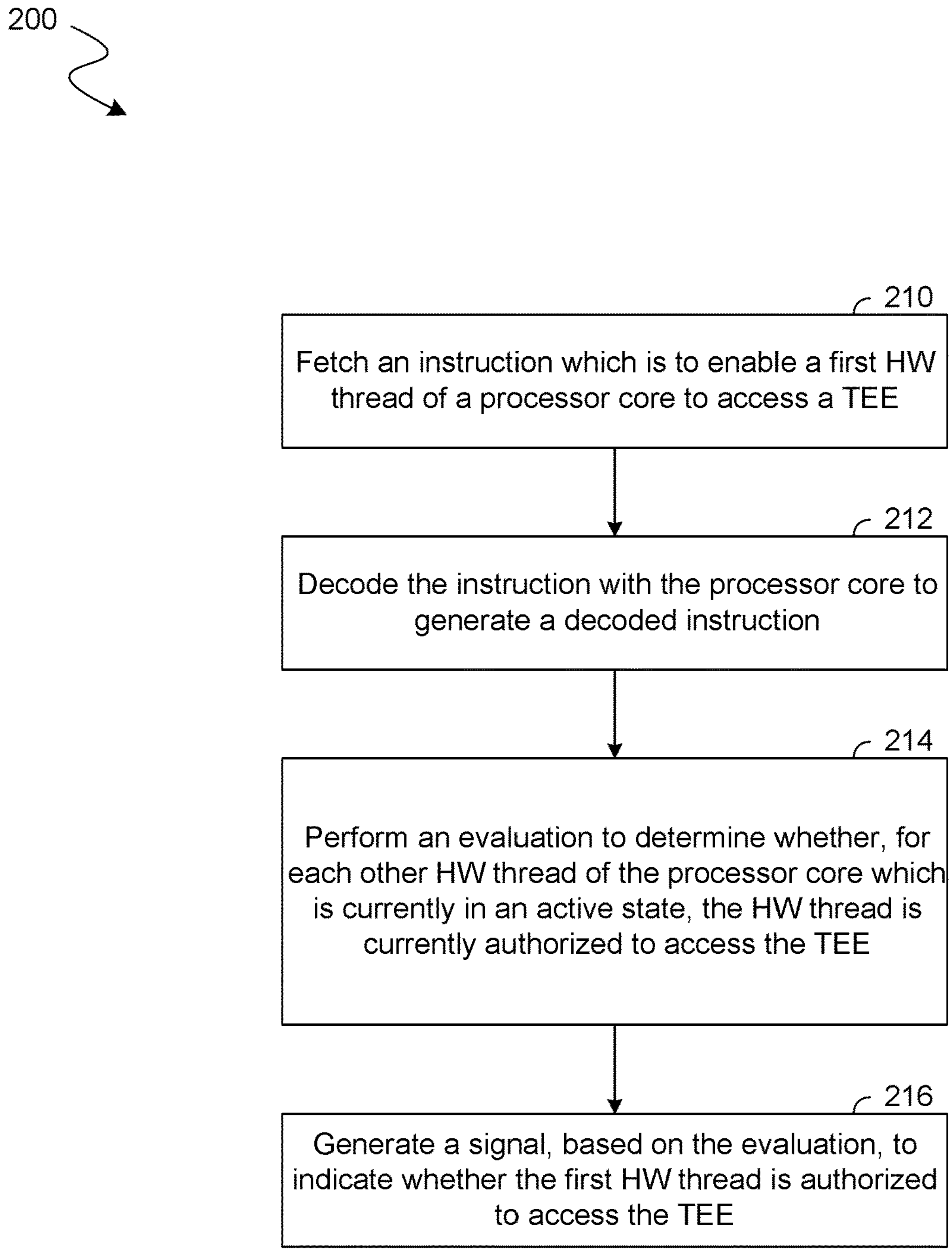
FIG. 2 shows a flow diagram illustrating features of a method to provide access to a trusted execution environment with a processor according to an embodiment.

FIG. 2 shows features of a method 200 to provide access to a trusted execution environment with a processor according to an embodiment. Method 200 illustrates one example of an embodiment, performed at a core of a processor, which conditions an access to a TEE by a HW thread on a requirement that any other HW thread of that same processor core—that is, any sibling HW thread—is either currently in an inactive (e.g., idle) state, or is authorized to access the TEE. In various embodiments, method 200 is performed with circuitry of computer system 100.

As shown in FIG. 2, method 200 comprises (at 210) fetching an instruction which is to enable a first HW thread of a processor core to access a TEE. In one such embodiment, the fetching at 210 comprises the decoder 805 shown in FIG. 8 fetches an instruction 801 which, for example, is an enclave enter instruction, an enclave resume instruction, or the like. Method 200 further comprises (at 212) decoding the instruction, with the processor core which includes the first HW thread, to generate a decoded instruction. For example, the decoding at 212 is performed with decoder circuit 106 of core_0 104.

In an embodiment, method 200 comprises executing the decoded instruction with the processor core. For example, executing the decoded instruction is performed with execution circuit 108 of core_0 104. In some embodiments, execution of the decoded instruction includes or otherwise results in one or more operations of method 200. For example, such one or more operations include (at 214) performing an evaluation to determine whether, for each other HW thread of the processor core which is currently in an active state (if any), the HW thread is currently authorized to access the TEE. In one such embodiment, the evaluation performed at 214 is to determine whether there is currently any sibling of the first HW thread which is both active, and is either executing in a different TEE (if any), or is executing outside of any TEE. Method 200 further comprises (at 216) generating a signal, based on the evaluation performed at 214, to indicate whether the first HW thread is authorized to access the TEE. In an embodiment, the signal generated at 216 is an exception, error or other suitable communication to prevent TEE entry if, in one example instance, at least one sibling HW thread is executing a respective software thread outside of the TEE.

Figure 3:
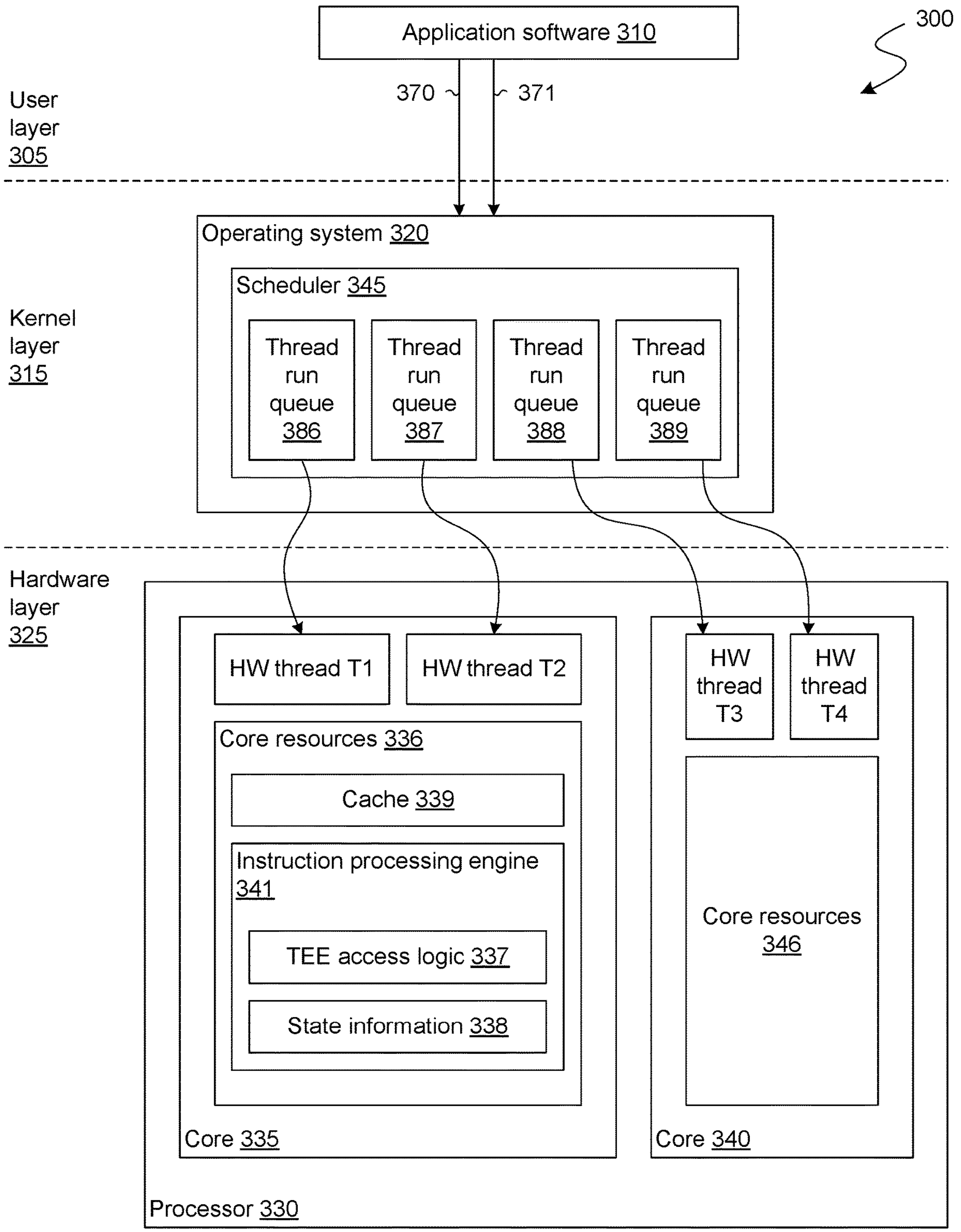
FIG. 3 shows a functional block diagram illustrating features of a system to determine an execution of sibling threads of execution according to an embodiment.

FIG. 3 shows features of a system 300 to determine an execution of sibling HW threads of execution according to an embodiment. The system 300 illustrates one example of an embodiment which is operable to perform the execution of an instruction for a HW thread to enter a TEE (or alternatively, for the HW thread to exit that TEE), wherein the execution includes or otherwise results in a determination as to whether another HW thread is to enter or exit the TEE. In various embodiments, system 300 provides functionality such as that of computer system 100—e.g., wherein one or more operations of method 200 are performed with system 300.

As shown in FIG. 3, a user layer 305 comprises application software 310 that will run in the system 300. It is understood that more than one application software can run in the user layer 305. A kernel layer 315 includes an operating system 320 with various features as described below. It is further noted that the kernel layer 315 may include other known operating system subsystems (not shown) such as, for example, a virtual memory subsystem, I/O subsystem, file subsystem, networking subsystem, process management subsystem, and/or other known subsystems that permit the operating system 320 to perform various known functions. In an embodiment, kernel layer 315 further comprises various data (not shown) including, for example, kernel data structures to permit the OS 320 operations.

A hardware layer 325 includes a processor 330 with one or more processor cores (e.g., including the illustrative cores 335, 340 shown). The total number and/or type(s) of processor cores in system 300 may vary, in different embodiments. For example, one or more additional processors (not shown) may be present in the hardware layer 325. Since the core 335 includes the hardware threads (i.e., logical processors) T1 and T2, the core 335 is a multithreaded core. The total number of the multiple hardware threads in core 335 can vary across different embodiments. Core 335 also has resources 336 which include, for example, a cache 339, instruction processing engine 341, and (for example) any of various known core resources. Although some embodiments are not limited in this regard, core 340 similarly comprises HW threads T3, T4, and core resources 346.

Hardware threads T1 and T2 will be used to discuss the following example operations, although in other embodiments, some or all such operations may also be applied to a core with more than two hardware threads. Threads T1 and T2 are sibling hardware threads because they are in the core 335. Typically, the operating system (OS) 320 is booted with hardware multithreading enabled in the hardware layer 325 for the cores. As the OS 320 boots, the OS 320 views hardware threads T1 and T2 (and, for example, hardware threads T1 and T2) each as one of multiple HW threads.

At a given time during operation of system 300, application software 310 (and/or other processes of user layer 305) can, for example, have two or more threads of execution (e.g., including the illustrative software threads 370 and 371 shown). As known to those skilled in the art, the number of software threads to be executed can vary. In an illustrative scenario according to one embodiment, HW thread T1 chooses, or is otherwise allocated, the software thread 370 (e.g., from a run queue 386 in scheduler 345), and executes that software thread 370. Similarly, HW thread T2 chooses, or is otherwise allocated, the software thread 371 (e.g., from another run queue 387 in scheduler 345), and executes that software thread 371. When processor 330 is configured to support multithreaded operation by core 335, the instruction processing engine 341 is available to be selectively shared between multiple hardware threads.

In one such embodiment, each of HW threads T3 and T4 chooses, or is otherwise allocated, a respective other software thread (not shown)—e.g., from one of run queues 388, 389 in scheduler 345—and executes that other software thread. When processor 330 is configured to support multithreaded operation by core 340, an instruction processing engine (not shown) of core resources 346 is available to be selectively shared between hardware threads T3, T4.

As described herein, some embodiments variously provide an enabling or disabling of multithreaded operation with multiple HW threads of a given processor core, where such enabling or disabling is performed, selectively, independent of an enabling or disabling (if any) of multithreaded operation with one or more other HW threads of that same processor core. Additionally or alternatively, such embodiments variously provide an enabling or disabling of multithreaded operation with one core of a processor, where such enabling or disabling is performed, selectively, independent of an enabling or disabling (if any) of multithreaded operation with another core of that same processor. In the examples below, two hardware threads T1 and T2 per processor core (e.g., core 335) are discussed. However, the below-discussed operations can also be applied to a processor core with more than two hardware threads.

In some embodiments, instruction processing engine 341 comprises TEE access logic 337, circuitry of which is operable to maintain, and refer to, state information 338 which specifies or otherwise indicates, for each HW thread of core 335, whether that HW thread is currently in an active state. In one such embodiment, state information 338 further specifies or otherwise indicates, for each currently active HW thread of core 335, which TEE (if any) that HW thread is currently able to access. During operation of processor 330, TEE access logic 337 (or other suitable logic of core 335) updates state information 338 as HW threads of processor 330 variously enter or exit different states of execution—e.g., including an inactive state and any of various active states. Similarly, TEE access logic 337 (or other suitable logic of core 335) updates state information 338 as HW threads of processor 330 variously enter or exit a given TEE—e.g., wherein state information 338 is updated to identify a specific one of multiple TEEs which are concurrently made available to core 335.

In an embodiment, TEE access logic 337 is accessed as part of the execution of an instruction by core 335—e.g., wherein the instruction is to enable a HW thread of core 335 to access a TEE, or (alternatively) is to disable access to the TEE by the HW thread. For example, execution of the instruction results in TEE access logic 337 accessing state information 338, which (in an embodiment) facilitates operation as a bitmask to prevent or enable access to a given TEE based on the current execution state(s) of the sibling HW threads.

Figure 4A:
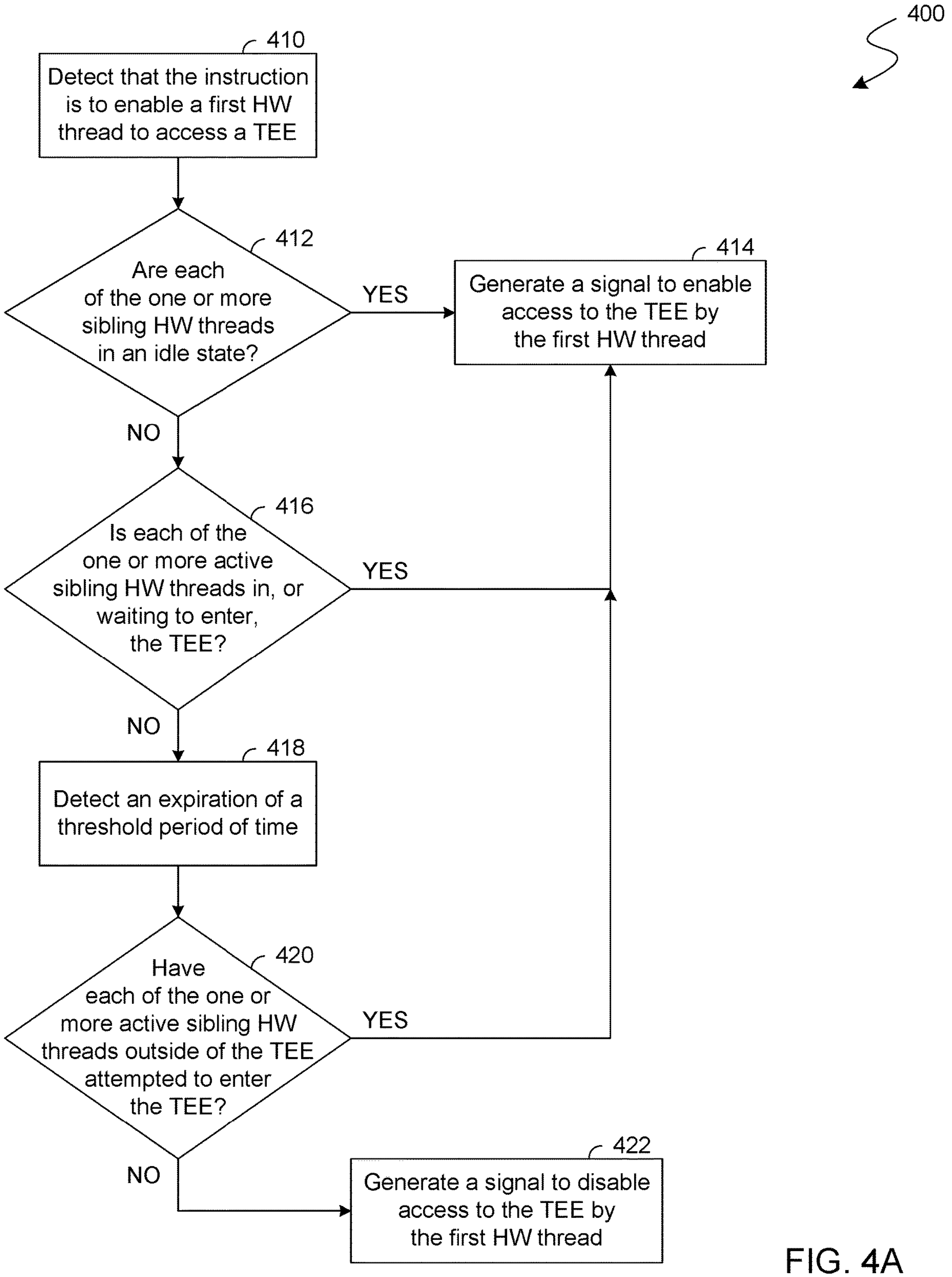
FIGS. 4A and 4B show flow diagrams each illustrating features of a respective method to determine an entry into a trusted execution environment with a hardware thread according to a corresponding embodiment.

FIG. 4A shows features of a method 400 to determine whether a HW thread is to have access to a trusted execution environment according to an embodiment. Method 400 illustrates one example of an embodiment, provided by the execution of an instruction, which requests that a first HW thread have access of a TEE, includes evaluating a state of execution of a sibling HW thread as one condition of a provisioning of the requested access. In various embodiments, method 400 is performed with circuitry of computer system 100 or system 300 (for example)—e.g., wherein method 400 includes or is otherwise based on operations of method 200.

As shown in FIG. 4A, method 400 comprises (at 410) detecting that the instruction is to enable a first HW thread, which is executing the instruction, to access a TEE. For example, the detecting at 410 includes execution circuit 108 identifying an opcode of the instruction—e.g., an EENTER (enclave enter) opcode, or an ERESUME (enclave resume) opcode of an Intel SGX (or other) instruction set—as one which functions as a request to begin, resume or otherwise provide TEE access to the first HW thread.

Based on the detecting at 410, method 400 performs an evaluation (at 412) to determine whether one or more sibling HW threads (that is, one or more other HW threads of the core which includes the first HW thread) are each in a respective idle state. By way of illustration and not limitation, the evaluation at 412 comprises TEE access logic 337 accessing state information 338 (for example) to detect whether any sibling HW thread is currently active.

Where it is determined at 412 that each of the first HW thread's one or more sibling HW threads is currently idle, method 400 (at 414) generates a signal to enable access to the TEE by the first HW thread. In an embodiment, the signal generated at 414 represents a decision to allow an initial access to the TEE by the first HW thread (e.g., where the instruction is an enclave entry instruction). In another embodiment, the signal generated at 414 represents a decision to allow a previously suspended TEE access to resume, or otherwise continue (e.g., where the instruction is an enclave reentry instruction or an enclave resume instruction). In one example embodiment, execution circuit 108 provides the signal generated at 414 to registers 110, to memory controller circuit 116 and/or to any other suitable circuitry of hardware processor 102 for facilitating access to enclave 124 by the first HW thread.

Where it is instead determined at 412 that some or all of the one or more sibling HW threads is active, method 400 performs another evaluation (at 416) to determine whether, for each of the one or more active sibling HW threads, that HW thread is in, or is waiting to enter, that same TEE. By way of illustration and not limitation, the evaluation at 416 comprises TEE access logic 337 accessing state information 338 (for example) to detect whether any active sibling HW thread is either executing outside of any TEE, or is executing in some other TEE (if any). Where it is determined at 416 that each of the one or more active sibling HW threads is in (or waiting to enter) the TEE, method 400 (at 414) generates the signal which is to enable, at least in part, access to the TEE by the first HW thread.

Where it is instead determined at 416 that at least one active sibling HW thread is either executing outside of any TEE, or is executing in some other TEE, method 400 (at 418) waits for the expiration of some predetermined threshold period of time (e.g., set by the hardware designer or other suitable agent) to allow for any such sibling HW thread to attempt entry into the TEE (or to be halted, for example). In one such embodiment, the evaluating at 416 results in method 200 signaling one or more such active sibling HW threads to enter into the TEE (or otherwise to transition to an idle state), and then waiting the threshold period of time to allow for any attempt at such entry. After the expiration of the threshold period of time, method 400 performs an evaluation (at 420) to determine whether each of those one or more active sibling HW threads, which were previously identified as being outside of the TEE, have attempted to enter the TEE. Where it is determined at 420 that any such HW thread has attempted to enter the TEE (and, for example, is in the TEE or has a pending approval to enter the TEE), method 400 (at 414) generates the signal which is to enable, at least in part, access to the TEE by the first HW thread.

Where it is instead determined at 420 that one or more such HW threads have not attempted to enter the TEE, method 400 (at 422) generates another signal to disable access to the TEE by the first HW thread. In one such embodiment, an exception is raised such as a novel #HT (hyperthread) exception which corresponds to a violation of a condition which the evaluations at 412, 416, 420 are performed to detect for.

Figure 4B:
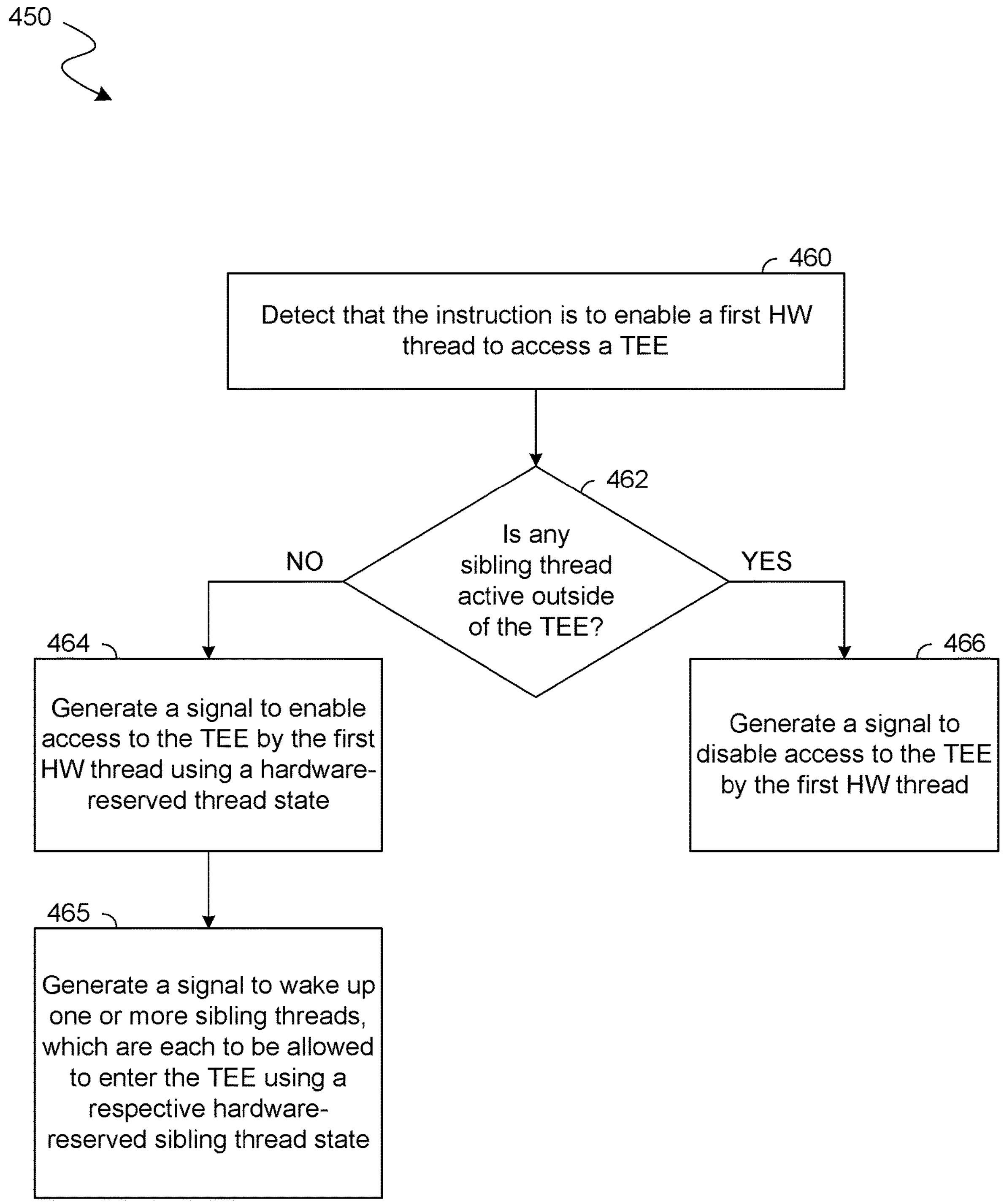

FIG. 4B shows features of a method 450 to determine whether access to a trusted execution environment is to be provided according to an embodiment. Method 450 illustrates one example of an embodiment, provided by the execution of an instruction, which requests that a first HW thread have access of a TEE, conditionally results in some or all sibling HW threads being woken for entry into the same TEE. In various embodiments, method 450 is performed with circuitry of computer system 100 or system 300 (for example)—e.g., wherein method 450 includes (or is otherwise based on), and/or is performed in combination with, operations of method 200 or method 400.

As shown in FIG. 4B, method 450 comprises (at 460) detecting that the instruction is to enable a first HW thread to access a TEE. For example, the detecting at 460 is similar to that which is performed at 410 of method 400. Based on the detecting at 460, method 450 performs an evaluation (at 462) to determine whether any sibling HW thread of the first HW thread is currently in an active state and executing outside of the TEE in question. By way of illustration and not limitation, the evaluation at 462 comprises TEE access logic 337 accessing state information 338 (for example) to detect whether any active sibling HW thread is either executing outside of any TEE, or is executing in some other TEE (if any).

Where it is determined at 462 that at least one sibling HW thread is active and executing outside of the TEE, method 450 (at 466) generates a signal to disable or otherwise prevent access to the TEE by the first HW thread. For example, the generating at 466 includes features of the signal generating at 422 of method 400.

Where it is instead determined at 462 that no sibling HW thread is active and outside of the TEE, method 450 (at 464) generates a signal to enable access to the TEE by the first HW thread using a hardware-reserved thread state. In an embodiment, the signal generated at 464 represents a decision to allow an initial access to the TEE by the first HW thread (e.g., where the instruction is an enclave entry instruction). Alternatively, the signal generated at 464 represents a decision to allow a previously suspended TEE access to resume, or otherwise continue (e.g., where the instruction is an enclave reentry instruction or an enclave resume instruction). In a different embodiment, the signal generated at 464 enables software to select or otherwise determine what an execution state of the first HW thread is to be (rather than the execution state being determined by a hardware reserved state).

Furthermore, method 450 (at 465) generates a signal to wake up one or more sibling HW threads (e.g., each idle sibling HW thread), which are each to be allowed to enter the TEE using a respective hardware-reserved sibling HW thread state. For example, the generating at 464 and/or at 466 includes features of the signal generating at 414 of method 400.

In various embodiments, method 450 avails of SGX-based techniques and mechanisms for implementing one or more enclave threads. In SGX-based systems, enclave threads are each backed by a respective Thread Control Structure (TCS), which in turn stores a context of the corresponding enclave thread in one of several State Save Areas (SSAs). Some embodiments variously exploit an availability of several SSAs for one TCS—e.g., wherein, based on the determining at 462, method 450 starts one or more additional threads of execution each with a different respective sibling of the first HW thread.

In an illustrative scenario according to one embodiment, the first HW thread, in performing method 450 by executing an enclave resume (ERESUME) instruction, restores its context from a State Save Areas SSA0 based on the signal generated at 464. Furthermore, based on the signal generated at 465, a second (sibling) HW thread restores its context from a State Save Area SSA1 (e.g., wherein another sibling HW thread restores its context from a State Save Area SSA2, etc.). In another illustrative scenario according to an embodiment, the first HW thread, based on method 450, uses the current state save area (CSSA) index, for example, as a unique identifier to determine what code it should execute in the enclave. Subsequently, execution of an enclave exit (EEXIT) instruction—or of an asynchronous enclave exit (AEX) instruction, for example—results in the respective contexts of the sibling HW thread(s) being stored in SSA0, SSA1, etc. The sibling HW threads are then successively halted, after which the first HW thread exits the enclave.

In various embodiments, the signal generated at 464, or the signal generated at 465, results in a processor core being provided with state of a given HW thread. By way of illustration and not limitation, in one embodiment, different registers of the processor core are variously (re)initialized to respective values that are solely determined by processor hardware. In an alternative embodiment, different registers of the processor core are instead variously (re)set to those respective values which they had after execution of the last instruction before the HW thread in question entered a particular TEE. In still another alternative embodiment, the respective values of different registers of the processor core are instead loaded from a context buffer in memory—e.g., wherein the context buffer provides values which the registers had at the time when HW thread in question last exited a particular TEE.

Traditional "virtual processor" structures—e.g., a virtual processor (VP) in TDX or a thread control structure (TCS) in SGX—typically provide only one processor context which is to be run by only one processor thread. By contrast, some embodiments provide functionality (such as that illustrated by method 450) to implement a "virtual core" structure which provides one process context, for each of one or more simultaneous multithreads, and which is to be run by the whole core. As a result, such embodiments improve the integrity of some kernel level security measures, such as any of various core scheduling features provided in Linux OSs.

Figure 5A:
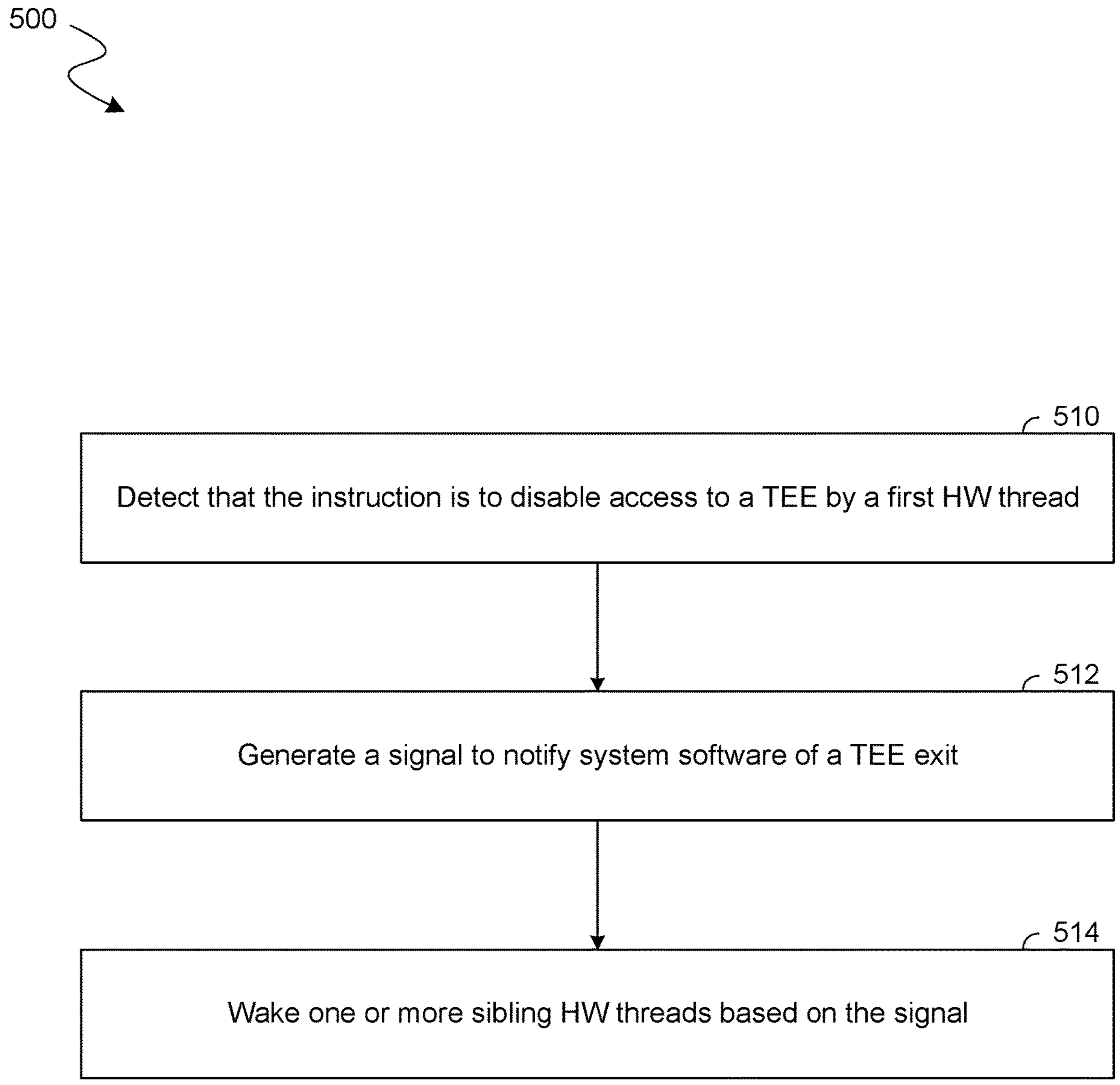
FIGS. 5A and 5B show flow diagrams each illustrating features of a respective method to determine an exit of a hardware thread from a trusted execution environment according to a corresponding embodiment.

FIG. 5A shows features of a method 500 to determine an exit of a hardware thread from a trusted execution environment according to an embodiment. Method 500 illustrates one example of an embodiment which, based on a TEE exit by one HW thread, identifies an opportunity to transition one or more sibling HW threads (which are currently idle) each to a respective active state. In various embodiments, method 500 is performed with circuitry of computer system 100 or system 300 (for example)—e.g., wherein method 500 includes (or is otherwise based on), or is performed in combination with, operations of one of methods 200, 400, 450.

As shown in FIG. 5A, method 500 comprises (at 510) detecting that the instruction is to disable access to a TEE by a first HW thread. By way of illustration and not limitation, an execution of an enclave exit instruction—such as a SGX EEXIT instruction—includes the first HW thread performing method 500. In some embodiments, a TEE exit by the first HW thread presents an opportunity for executing one or more sibling HW threads—e.g., wherein said one or more sibling HW threads would otherwise be precluded (according to method 400, for example) from executing while the first HW thread is in the TEE.

Accordingly, based on the detecting at 510, method 500 (at 512) generates a signal to notify system software of a TEE exit by the first HW thread. For example, executing the instruction includes or otherwise results in method 500 generating an exception which indicates the TEE exit to an OS and/or any of various other suitable software processes.

In one such embodiment, method 500 further comprises (at 514) waking the one or more sibling HW threads based on the signal which is generated at 512. In some embodiments, processor hardware generates the signal at 512 to notify software that (due to the TEE exit by the first HW thread, for example) it is possible for the software to schedule one or more other processes each for a respective sibling HW thread which is currently halted. In one such embodiment, process scheduling by software includes or otherwise results in such software waking one or more sibling HW threads at 514. In an alternative embodiment, method 500 omits, but nevertheless results in, the waking up at 514 (e.g., wherein such waking is performed by software based on an output of the instruction execution).

Figure 5B:
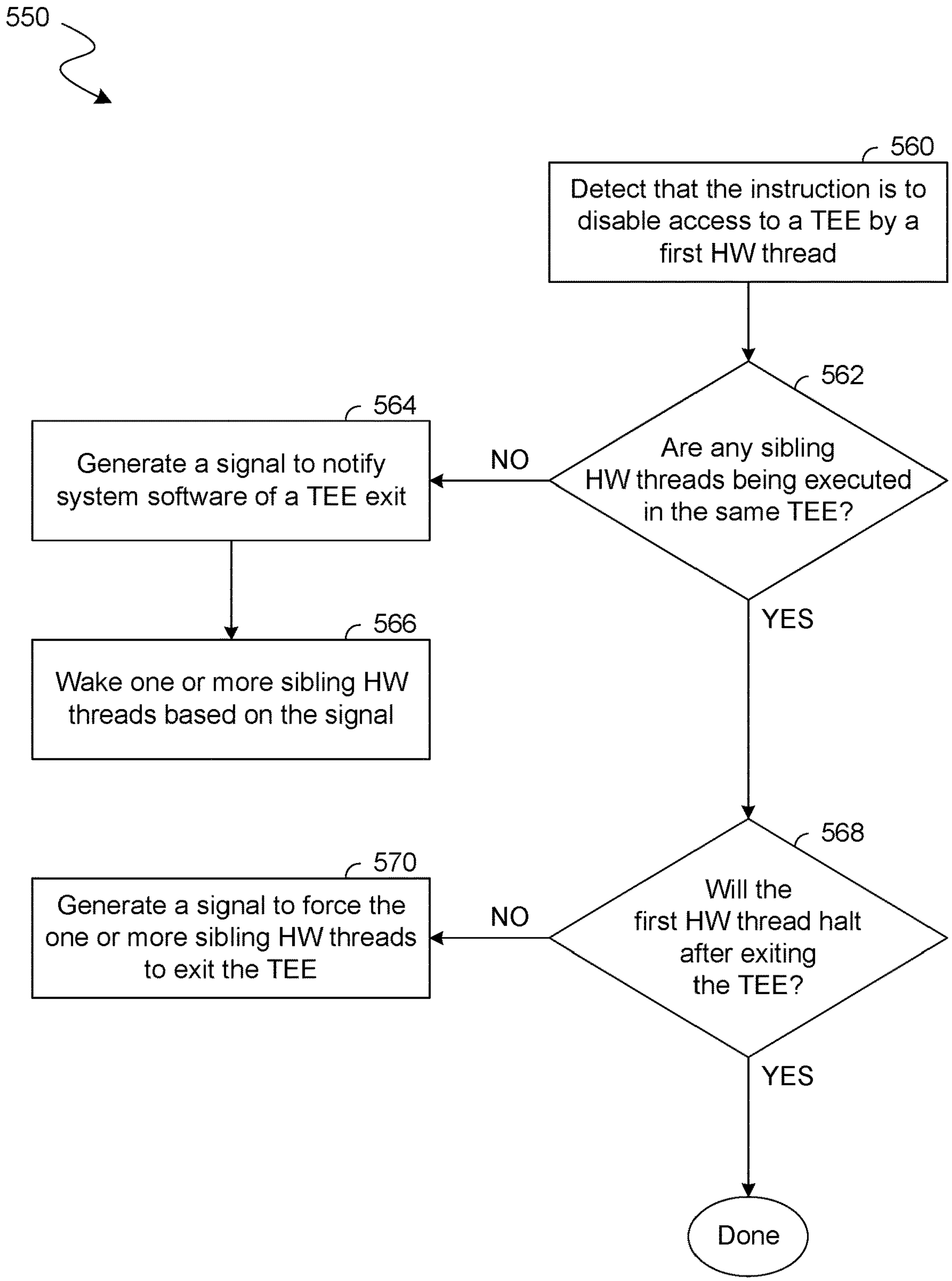

FIG. 5B shows features of a method 550 to determine an exit of a hardware thread from a trusted execution environment according to an embodiment. Method 550 illustrates one example of an embodiment which, in executing an instruction for one HW thread to exit a TEE, identifies an opportunity to activate one or more sibling HW threads, or prevents the execution of one or more sibling HW threads (if any) in the TEE while the HW thread continues to execute outside of the TEE. In various embodiments, method 550 is performed with circuitry of computer system 100 or system 300 (for example)—e.g., wherein method 550 includes (or is otherwise based on), or is performed in combination with, operations of one of methods 200, 400, 450, 500.

As shown in FIG. 5B, method 550 comprises (at 560) detecting that the instruction is to disable access to a TEE by a first HW thread. By way of illustration and not limitation, an execution of an enclave exit instruction—such as a SGX EEXIT instruction—includes the first HW thread performing method 550. In some embodiments, a TEE exit by the first HW thread potentially presents an opportunity for executing one or more sibling HW threads.

Accordingly, based on the detecting at 560, method 550 performs an evaluation (at 562) to determine whether any of the first HW thread's one or more sibling HW threads is currently being executed in the same TEE. Where it is determined at 562 that no sibling HW thread is currently in the TEE, method 550 (at 564) generates a signal to notify system software of the TEE exit by the first HW thread. In one such embodiment, method 550 wakes one or more idle sibling HW threads (at 566)—if any—based on the signal which is generated at 564. However, in other embodiments, method 550 omits the waking at 566—e.g., wherein each of the sibling HW threads is already active, but is executing each in a respective other TEE, or wherein the waking is not part of (but is nevertheless based on) the execution of the instruction. In some embodiments, processor hardware generates the signal at 564 to notify software that (due to the TEE exit by the first HW thread, for example) it is possible for the software to schedule one or more other processes each for a respective sibling HW thread which is currently halted. In one such embodiment, such scheduling by software includes or otherwise results in such software waking one or more sibling HW threads at 566.

Where it is instead determined at 562 that at least one sibling HW thread is in the TEE, method 550 performs an evaluation (at 568) to determine whether the first HW thread is expected to halt execution after exiting the TEE. For example, the evaluating at 568 includes identifying whether the first HW thread is expected to continue executing outside of the TEE—e.g., rather than transitioning to some idle state.

Where it is determined at 568 that the first HW thread will halt execution after the TEE exit, method 550 ends (or alternatively, continues to perform any other suitable operations which implement the TEE exit by the first HW thread). Where it is instead determined at 568 that the first HW thread will not halt execution after it exits the TEE, method 550 (at 570) generates a signal to force those one or more sibling HW threads, which are currently in the TEE, to exit the TEE. By way of illustration and not limitation, in one embodiment, this signal triggers an asynchronous exit (AEX) by a given sibling HW thread, wherein the first HW thread then busy-waits until that sibling HW thread acknowledges receipt of the signal, after which the sibling HW thread exits the TEE.

Figure 6:
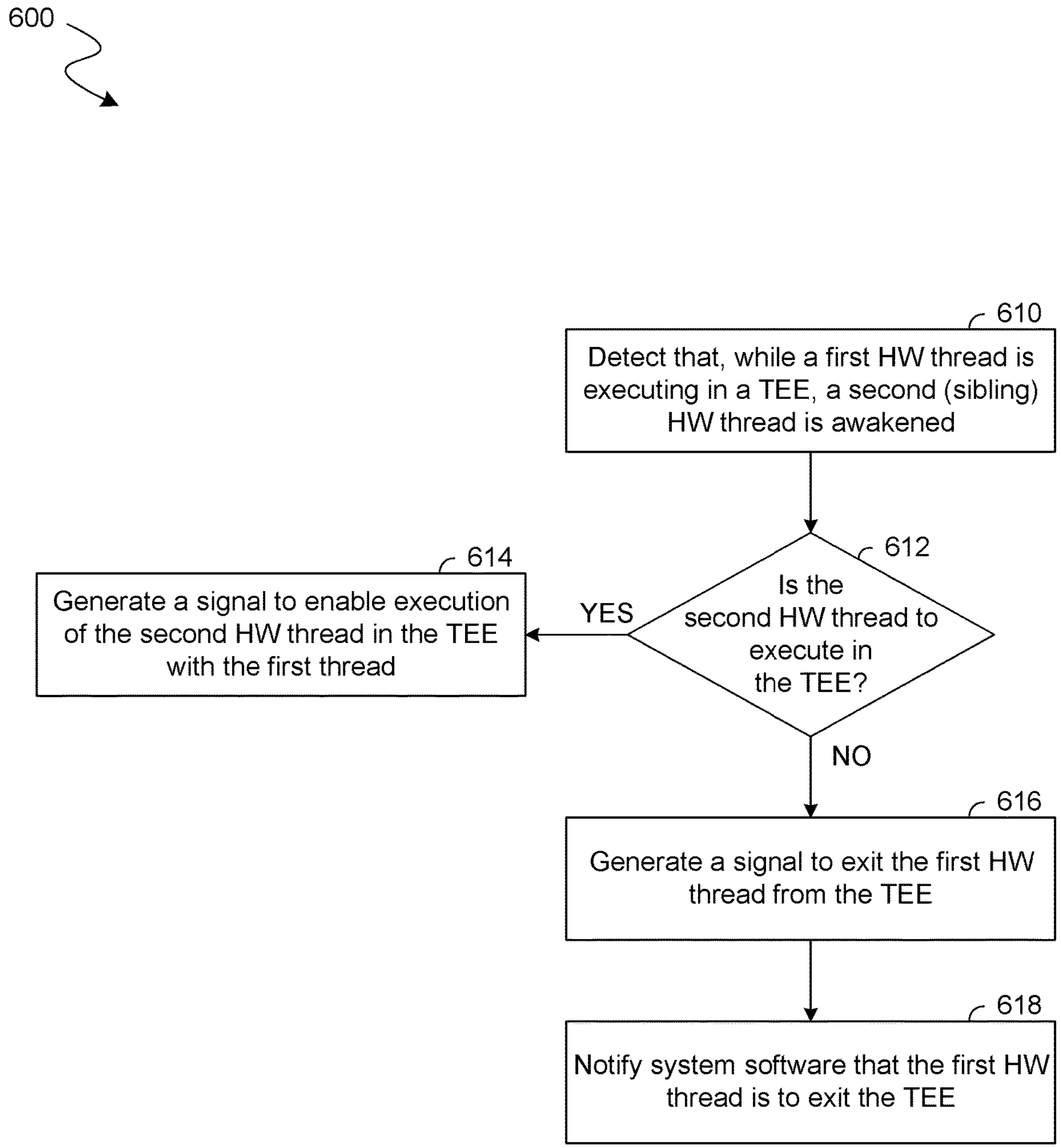
FIG. 6 shows a flow diagram illustrating features of a method to determine respective execution states of hardware threads according to an embodiment.

FIG. 6 shows features of a method 600 to determine respective execution states of hardware threads according to an embodiment. Method 600 illustrates one example of an embodiment which implements a prioritization of one HW thread over a sibling of that HW thread—e.g., wherein the prioritization is with respect to an accessibility to a given TEE. In various embodiments, method 600 is performed with circuitry of computer system 100 or system 300 (for example)—e.g., wherein method 600 includes (or is otherwise based on), or is performed in combination with, operations of one of methods 200, 400, 450, 500, 550.

As shown in FIG. 6, method 600 comprises (at 610) detecting that, while a first HW thread is executing in a TEE, a second HW thread—which is a sibling of the first HW thread—is awakened from an idle state. Based on the detecting at 610, method 600 performs an evaluation (at 612) to determine whether the second HW thread is to execute in the same TEE as the first HW thread. Where it is determined at 612 that the second HW thread is to execute in the same TEE, method 600 (at 614) generates a signal to enable execution of the second HW thread in the TEE with the first HW thread.

Where it is instead determined at 612 that the second HW thread is not to execute in the same TEE (e.g., in a different TEE, or outside of any TEE), method 600 (at 616) generates a signal to exit the first HW thread from the TEE. For example, the processor core signals the first HW thread to perform an asynchronous exit. In one such embodiment, method 600 further notifies system software (at 618)—e.g., with an exception or other suitable signal—that the first HW thread is to exit the TEE In an embodiment, the notifying at 618 includes communicating an exception (or other suitable signal) to notify system software that the first HW thread was forced to exit the TEE. In an illustrative scenario according to one embodiment, when the second (sibling) HW thread wakes—e.g., moves from any of the C1-C6 idle sleep states to the C0 active state—it sends to the first HW thread a signal that triggers an asynchronous exit (AEX) if the first HW thread is executing in an SGX enclave. The second HW thread then busy-waits until the first HW thread acknowledges receipt of the signal and the first HW thread exits the TEE. In one such embodiment, this AEX-triggering event raises an exception to instruct the system software to halt the sibling HW thread (at least temporarily) and allow the first HW thread to reattempt TEE entry.

Figure 7:
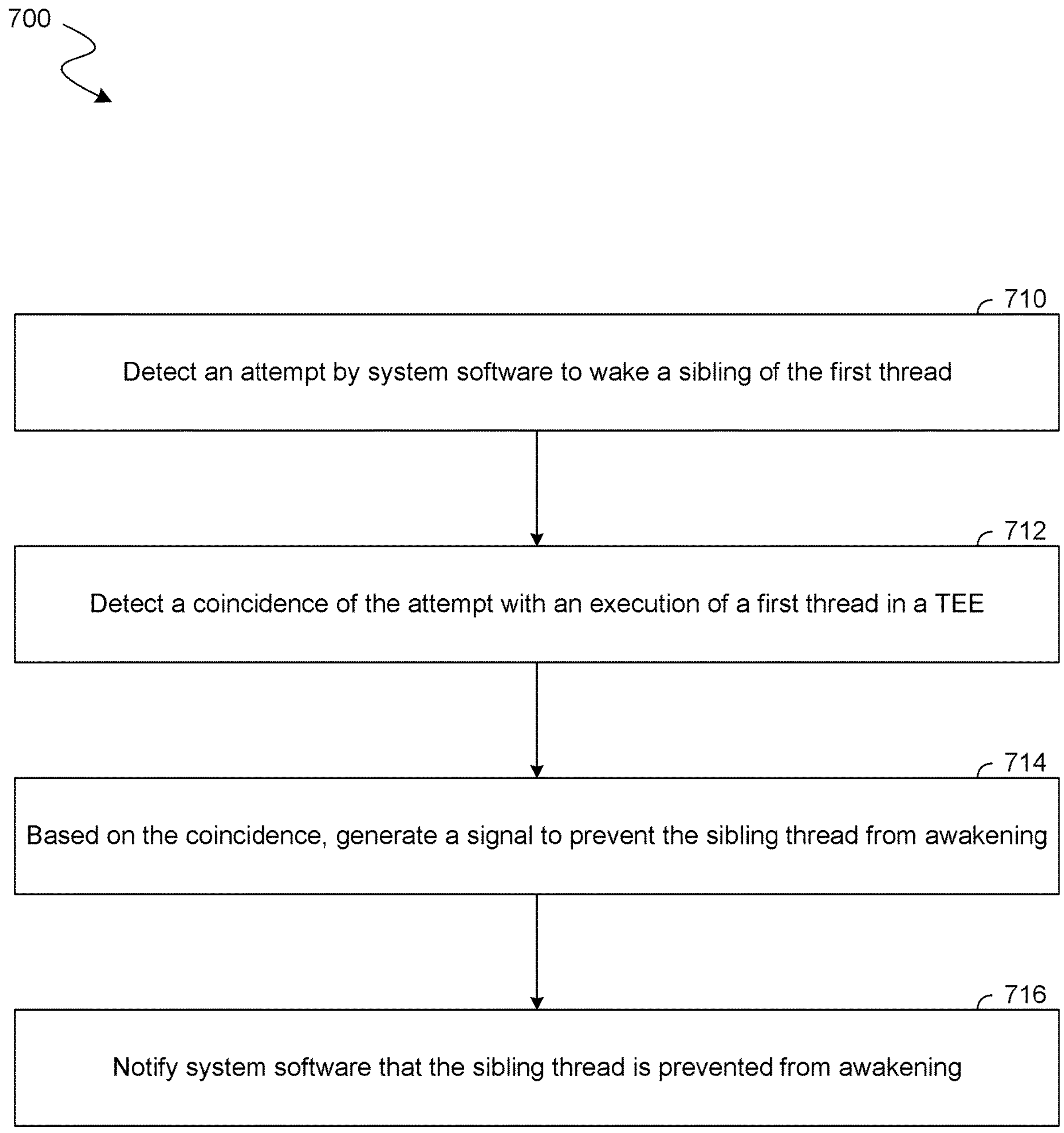
FIG. 7 shows a flow diagram illustrating features of a method to enter sibling threads into a trusted execution environment according to an embodiment.

FIG. 7 shows features of a method 700 to enter sibling HW threads into a trusted execution environment according to an embodiment. Method 700 illustrates one example of an embodiment which prioritizes a HW thread which is already in a TEE over a sibling HW thread which is at least attempting to transition from an idle state to an active state. In various embodiments, method 600 is performed with circuitry of computer system 100 or system 300 (for example)—e.g., wherein method 600 includes (or is otherwise based on), or is performed in combination with, operations of one of methods 200, 400, 450, 500, 550, 600.

As shown in FIG. 7, method 700 comprises (at 710) detecting an attempt by system software to wake a second HW thread which is a sibling of the first HW thread. Method 700 further comprises (at 712) detecting a coincidence of the attempt with an execution of a first HW thread in a TEE. Based on the coincidence which is detected at 712, method 700 (at 714) generates a signal to prevent the second HW thread from awakening.

For example, an Intel x86 processor is adapted, in one such embodiment, to mask an interrupt for the second HW thread while the first HW thread is executing in the TEE. In another embodiment, a processor comprises circuitry which is operable to trigger an exception on the second HW thread if the second HW thread receives a wake-up signal (such as an interrupt) while the first HW thread is executing in a TEE. In the example embodiment shown, method 700 further notifies system software (at 716) that the second HW thread is prevented from awakening.

Figure 8:
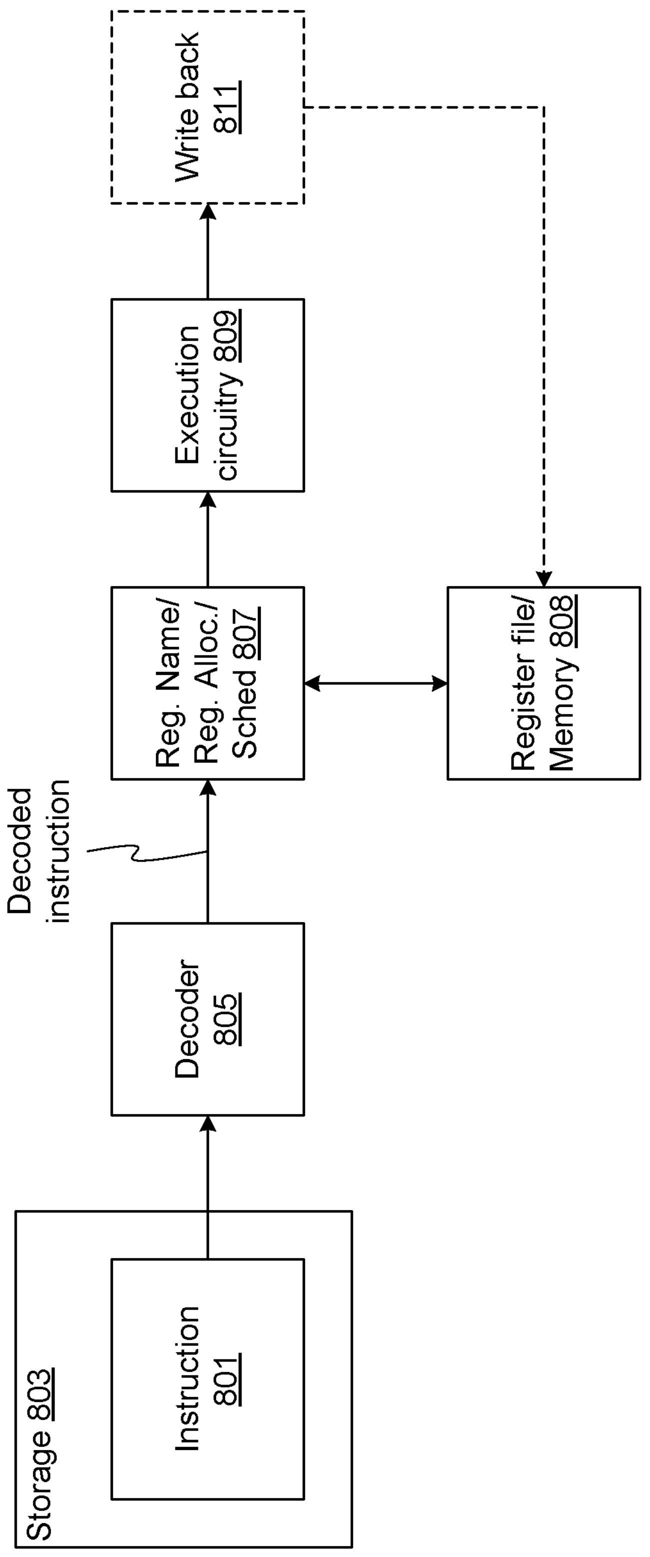
FIG. 8 illustrates processor hardware to execute an instruction according to an embodiment.

FIG. 8 illustrates examples of hardware to process an instruction. The instruction may be an enclave enter instruction, an enclave resume instruction, an enclave exit instruction or any of various other instructions to request access to resources of an enclave which facilitates a TEE. As illustrated, storage 803 stores an instruction 801 to be executed.

The instruction 801 is received by decoder circuitry 805. For example, the decoder circuitry 805 receives this instruction from fetch circuitry (not shown). The instruction may be in any suitable format, such as that describe with reference to FIG. 14 below. In an example, the instruction includes fields for an opcode, and (in some embodiments) a source identifier, and/or a destination identifier. In some examples, a source and destination are registers, and in other examples one or more are memory locations. In some examples, one or more of the sources may be an immediate operand. In some examples, the opcode details one or more operations to be performed to determine whether a HW thread is to enter (or alternatively, to exit) a TEE.

More detailed examples of at least one instruction format for the instruction are detailed herein. The decoder circuitry 805 decodes the instruction into one or more operations. In some examples, this decoding includes generating a plurality of micro-operations to be performed by execution circuitry (such as execution circuitry 809). The decoder circuitry 805 also decodes instruction prefixes.

In some examples, register renaming, register allocation, and/or scheduling circuitry 807 provides functionality for one or more of: 1) renaming logical operand values to physical operand values (e.g., a register alias table in some examples), 2) allocating status bits and flags to the decoded instruction, and 3) scheduling the decoded instruction for execution by execution circuitry out of an instruction pool (e.g., using a reservation station in some examples).

Registers (register file) and/or memory 808 store data as operands of the instruction to be operated on by execution circuitry 809. Exemplary register types include packed data registers, general purpose registers (GPRs), and floating-point registers.

Execution circuitry 809 executes the decoded instruction. Exemplary detailed execution circuitry includes execution cluster(s) 1160 shown in FIG. 11B, etc. The execution of the decoded instruction causes the execution circuitry to operations (as described herein) to determine whether a HW thread is to enter—or alternatively, is to exit—a TEE.

In some examples, retirement/write back circuitry 811 architecturally commits the destination register into the registers or memory 808 and retires the instruction.

An example of a format for instruction 801 is OPCODE DST, SRC1, SRC2. In some examples, OPCODE is the opcode mnemonic of the instruction. DST is a field for the destination operand, such as packed data register or memory. SRC1 and SRC2 are fields for the source operands, such as packed data registers and/or memory.

Exemplary Computer Architectures

Detailed below are describes of exemplary computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 9:
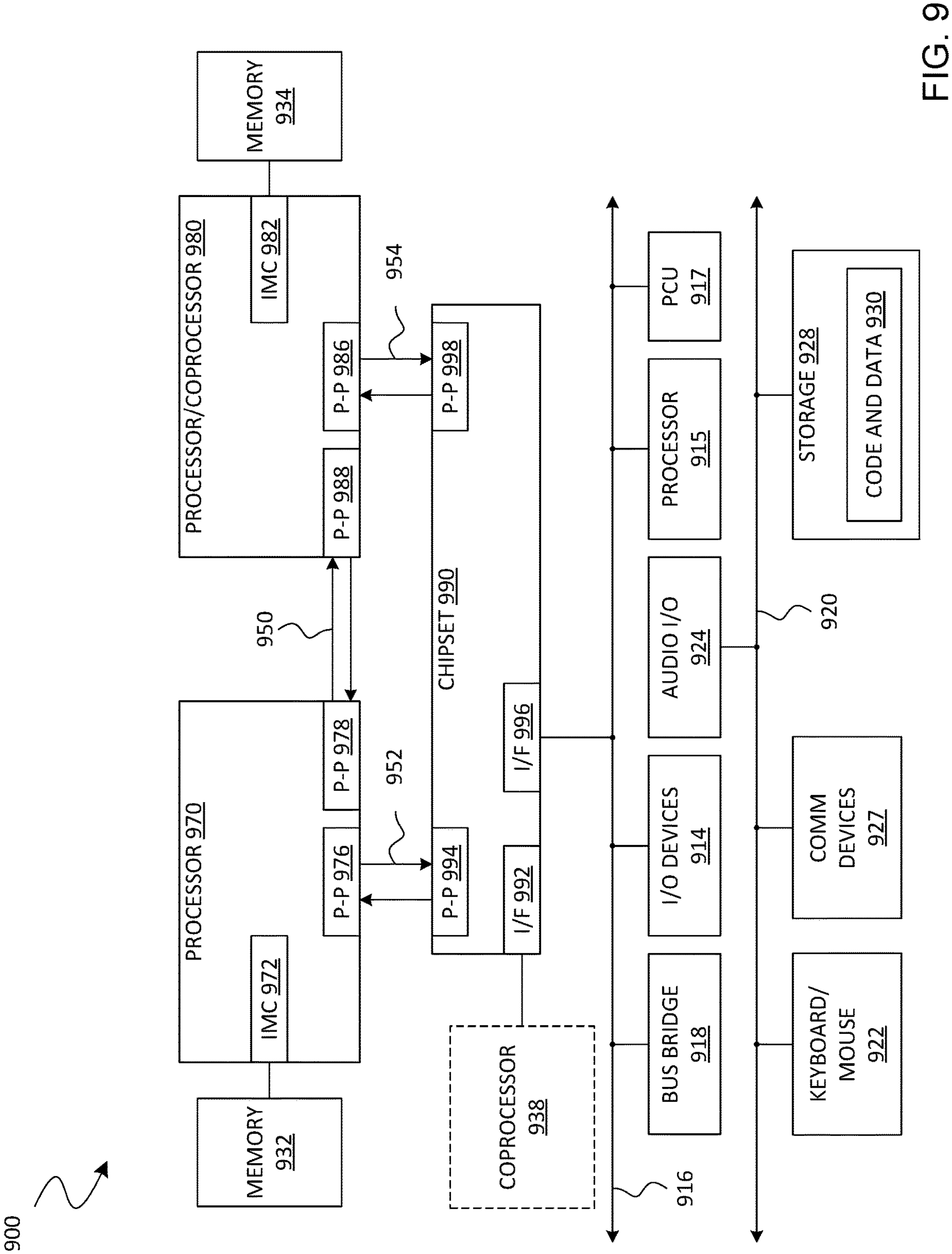
FIG. 9 illustrates an exemplary system.

FIG. 9 illustrates an exemplary system. Multiprocessor system 900 is a point-to-point interconnect system and includes a plurality of processors including a first processor 970 and a second processor 980 coupled via a point-to-point interconnect 950. In some examples, the first processor 970 and the second processor 980 are homogeneous. In some examples, first processor 970 and the second processor 980 are heterogenous. Though the exemplary system 900 is shown to have two processors, the system may have three or more processors, or may be a single processor system.

Processors 970 and 980 are shown including integrated memory controller (IMC) circuitry 972 and 982, respectively. Processor 970 also includes as part of its interconnect controller point-to-point (P-P) interfaces 976 and 978; similarly, second processor 980 includes P-P interfaces 986 and 988. Processors 970, 980 may exchange information via the point-to-point (P-P) interconnect 950 using P-P interface circuits 978, 988. IMCs 972 and 982 couple the processors 970, 980 to respective memories, namely a memory 932 and a memory 934, which may be portions of main memory locally attached to the respective processors.

Processors 970, 980 may each exchange information with a chipset 990 via individual P-P interconnects 952, 954 using point to point interface circuits 976, 994, 986, 998. Chipset 990 may optionally exchange information with a coprocessor 938 via an interface 992. In some examples, the coprocessor 938 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 970, 980 or outside of both processors, yet connected with the processors via P-P interconnect, such that either or both processors' local cache information may be stored in the shared cache if a processor is placed into a low power mode.

Chipset 990 may be coupled to a first interconnect 916 via an interface 996. In some examples, first interconnect 916 may be a Peripheral Component Interconnect (PCI) interconnect, or an interconnect such as a PCI Express interconnect or another I/O interconnect. In some examples, one of the interconnects couples to a power control unit (PCU) 917, which may include circuitry, software, and/or firmware to perform power management operations with regard to the processors 970, 980 and/or co-processor 938. PCU 917 provides control information to a voltage regulator (not shown) to cause the voltage regulator to generate the appropriate regulated voltage. PCU 917 also provides control information to control the operating voltage generated. In various examples, PCU 917 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 917 is illustrated as being present as logic separate from the processor 970 and/or processor 980. In other cases, PCU 917 may execute on a given one or more of cores (not shown) of processor 970 or 980. In some cases, PCU 917 may be implemented as a microcontroller (dedicated or general-purpose) or other control logic configured to execute its own dedicated power management code, sometimes referred to as P-code. In yet other examples, power management operations to be performed by PCU 917 may be implemented externally to a processor, such as by way of a separate power management integrated circuit (PMIC) or another component external to the processor. In yet other examples, power management operations to be performed by PCU 917 may be implemented within BIOS or other system software.

Various I/O devices 914 may be coupled to first interconnect 916, along with a bus bridge 918 which couples first interconnect 916 to a second interconnect 920. In some examples, one or more additional processor(s) 915, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interconnect 916. In some examples, second interconnect 920 may be a low pin count (LPC) interconnect. Various devices may be coupled to second interconnect 920 including, for example, a keyboard and/or mouse 922, communication devices 927 and a storage circuitry 928. Storage circuitry 928 may be one or more non-transitory machine-readable storage media as described below, such as a disk drive or other mass storage device which may include instructions/code and data 930 and may implement the storage 803 in some examples. Further, an audio I/O 924 may be coupled to second interconnect 920. Note that other architectures than the point-to-point architecture described above are possible. For example, instead of the point-to-point architecture, a system such as multiprocessor system 900 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 10:
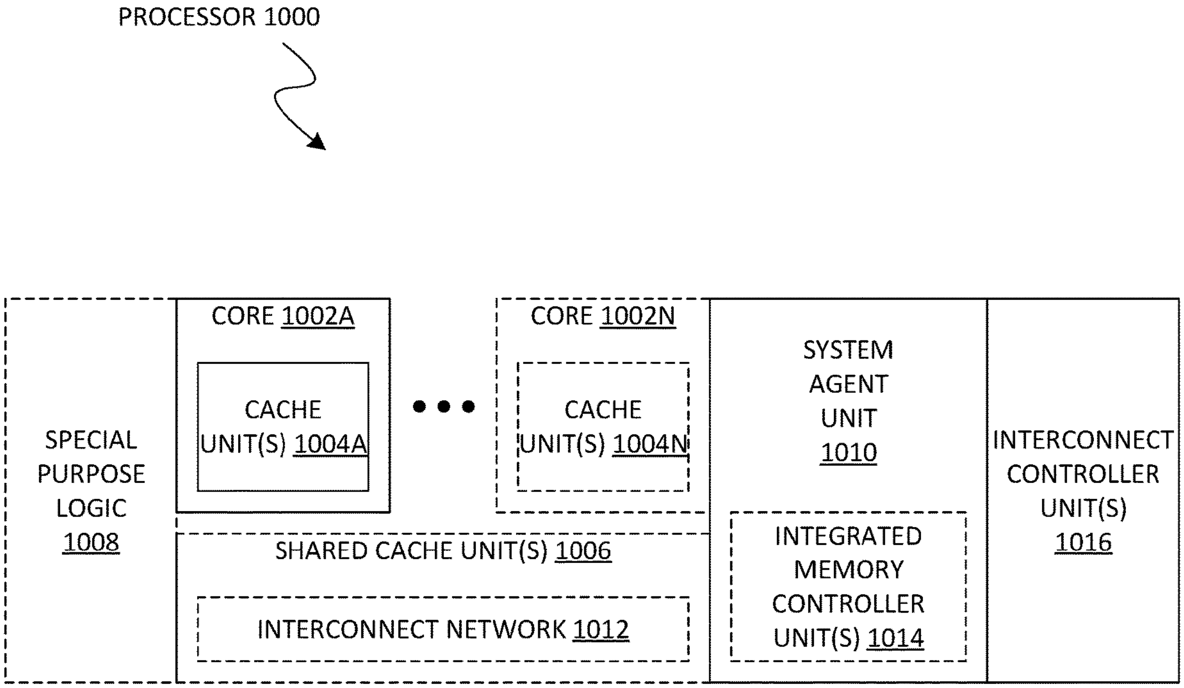
FIG. 10 illustrates a block diagram of an example processor that may have more than one core and an integrated memory controller.

FIG. 10 illustrates a block diagram of an example processor 1000 that may have more than one core and an integrated memory controller. The solid lined boxes illustrate a processor 1000 with a single core 1002A, a system agent unit circuitry 1010, a set of one or more interconnect controller unit(s) circuitry 1016, while the optional addition of the dashed lined boxes illustrates an alternative processor 1000 with multiple cores 1002A-N, a set of one or more integrated memory controller unit(s) circuitry 1014 in the system agent unit circuitry 1010, and special purpose logic 1008, as well as a set of one or more interconnect controller units circuitry 1016. Note that the processor 1000 may be one of the processors 970 or 980, or co-processor 938 or 915 of FIG. 9.

Thus, different implementations of the processor 1000 may include: 1) a CPU with the special purpose logic 1008 being integrated graphics and/or scientific (throughput) logic (which may include one or more cores, not shown), and the cores 1002A-N being one or more general purpose cores (e.g., general purpose in-order cores, general purpose out-of-order cores, or a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 1004A-N within the cores 1002A-N, a set of one or more shared cache unit(s) circuitry 1006, and external memory (not shown) coupled to the set of integrated memory controller unit(s) circuitry 1014. The set of one or more shared cache unit(s) circuitry 1006 may include one or more mid-level caches, such as level 2 (L2), level 3 (L3), level 4 (L4), or other levels of cache, such as a last level cache (LLC), and/or combinations thereof. While in some examples ring-based interconnect network circuitry 1012 interconnects the special purpose logic 1008 (e.g., integrated graphics logic), the set of shared cache unit(s) circuitry 1006, and the system agent unit circuitry 1010, alternative examples use any number of well-known techniques for interconnecting such units. In some examples, coherency is maintained between one or more of the shared cache unit(s) circuitry 1006 and cores 1002A-N.

In some examples, one or more of the cores 1002A-N are capable of multi-threading. The system agent unit circuitry 1010 includes those components coordinating and operating cores 1002A-N. The system agent unit circuitry 1010 may include, for example, power control unit (PCU) circuitry and/or display unit circuitry (not shown). The PCU may be or may include logic and components needed for regulating the power state of the cores 1002A-N and/or the special purpose logic 1008 (e.g., integrated graphics logic). The display unit circuitry is for driving one or more externally connected displays.

The cores 1002A-N may be homogenous in terms of instruction set architecture (ISA). Alternatively, the cores 1002A-N may be heterogeneous in terms of ISA; that is, a subset of the cores 1002A-N may be capable of executing an ISA, while other cores may be capable of executing only a subset of that ISA or another ISA.

Exemplary Core Architectures—In-Order and Out-of-Order Core Block Diagram

Figure 11A:
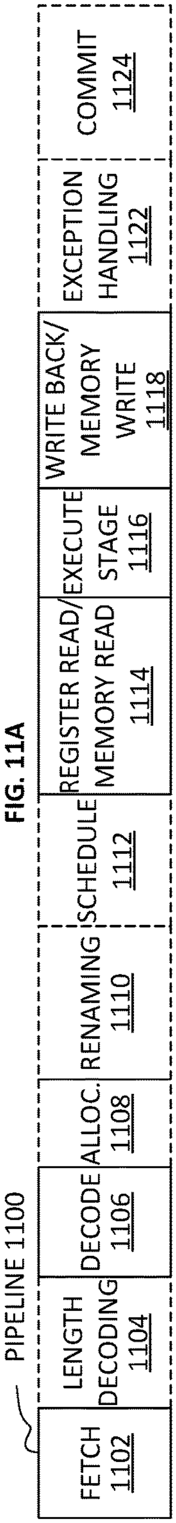
FIG. 11A is a block diagram illustrating both an exemplary in-order pipeline and an exemplary register renaming, out-of-order issue/execution pipeline according to examples.
Figure 11B:
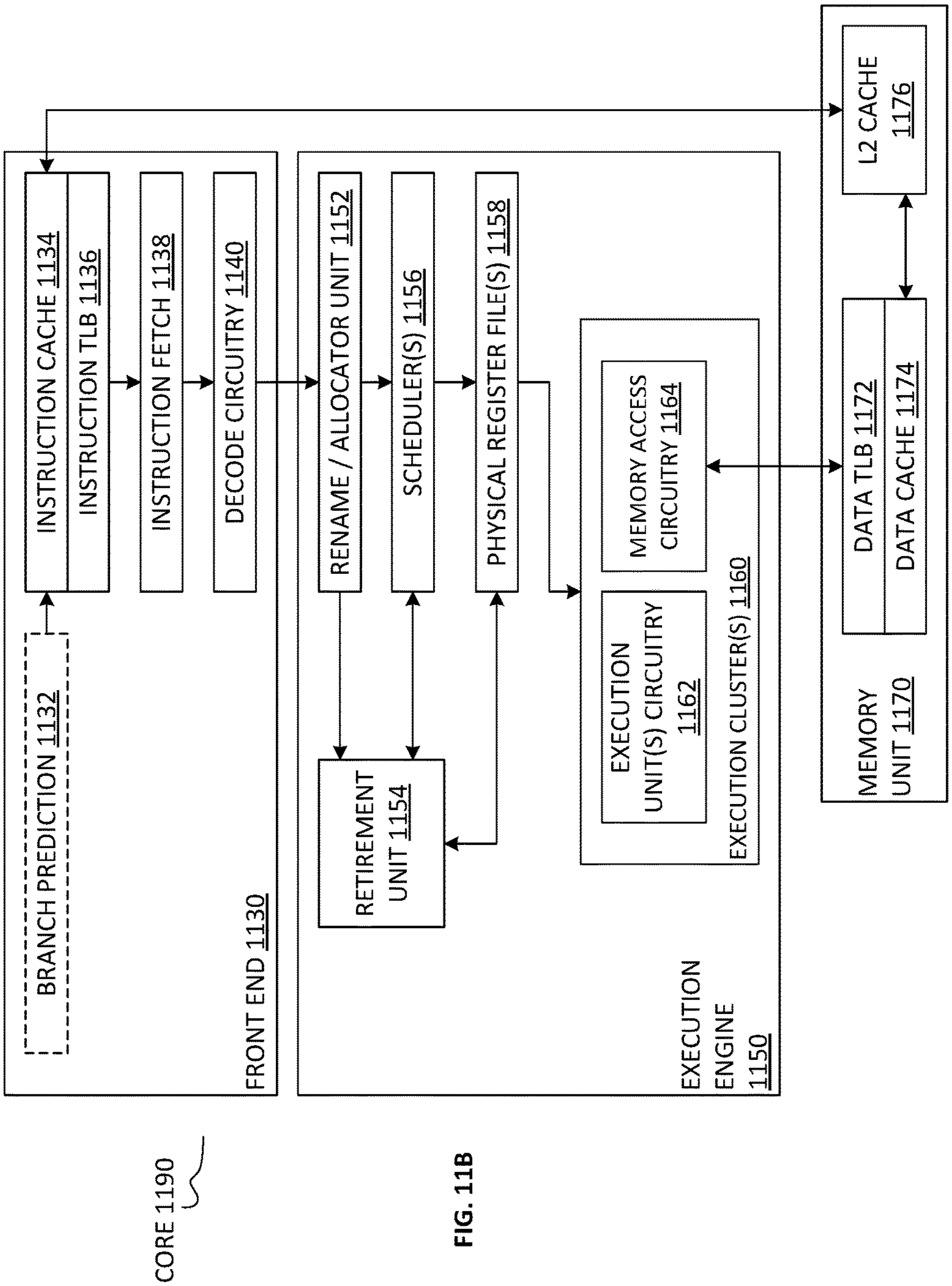
FIG. 11B is a block diagram illustrating both an exemplary example of an in-order architecture core and an exemplary register renaming, out-of-order issue/execution architecture core to be included in a processor according to examples.

FIG. 11A is a block diagram illustrating both an exemplary in-order pipeline and an exemplary register renaming, out-of-order issue/execution pipeline according to examples. FIG. 11B is a block diagram illustrating both an exemplary example of an in-order architecture core and an exemplary register renaming, out-of-order issue/execution architecture core to be included in a processor according to examples. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, an optional length decoding stage 1104, a decode stage 1106, an optional allocation (Alloc) stage 1108, an optional renaming stage 1110, a schedule (also known as a dispatch or issue) stage 1112, an optional register read/memory read stage 1114, an execute stage 1116, a write back/memory write stage 1118, an optional exception handling stage 1122, and an optional commit stage 1124. One or more operations can be performed in each of these processor pipeline stages. For example, during the fetch stage 1102, one or more instructions are fetched from instruction memory, and during the decode stage 1106, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1106 and the register read/memory read stage 1114 may be combined into one pipeline stage. In one example, during the execute stage 1116, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution architecture core of FIG. 11B may implement the pipeline 1100 as follows: 1) the instruction fetch circuitry 1138 performs the fetch and length decoding stages 1102 and 1104; 2) the decode circuitry 1140 performs the decode stage 1106; 3) the rename/allocator unit circuitry 1152 performs the allocation stage 1108 and renaming stage 1110; 4) the scheduler(s) circuitry 1156 performs the schedule stage 1112; 5) the physical register file(s) circuitry 1158 and the memory unit circuitry 1170 perform the register read/memory read stage 1114; the execution cluster(s) 1160 perform the execute stage 1116; 6) the memory unit circuitry 1170 and the physical register file(s) circuitry 1158 perform the write back/memory write stage 1118; 7) various circuitry may be involved in the exception handling stage 1122; and 8) the retirement unit circuitry 1154 and the physical register file(s) circuitry 1158 perform the commit stage 1124.

FIG. 11B shows a processor core 1190 including front-end unit circuitry 1130 coupled to an execution engine unit circuitry 1150, and both are coupled to a memory unit circuitry 1170. The core 1190 may be a reduced instruction set architecture computing (RISC) core, a complex instruction set architecture computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit circuitry 1130 may include branch prediction circuitry 1132 coupled to an instruction cache circuitry 1134, which is coupled to an instruction translation lookaside buffer (TLB) 1136, which is coupled to instruction fetch circuitry 1138, which is coupled to decode circuitry 1140. In one example, the instruction cache circuitry 1134 is included in the memory unit circuitry 1170 rather than the front-end circuitry 1130. The decode circuitry 1140 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1140 may further include an address generation unit (AGU, not shown) circuitry. In one example, the AGU generates an LSU address using forwarded register ports, and may further perform branch forwarding (e.g., immediate offset branch forwarding. LR register branch forwarding, etc.). The decode circuitry 1140 may be implemented using various different mechanisms. Examples of suitable mechanisms include, but are not limited to, look-up tables, hardware implementations, programmable logic arrays (PLAs), microcode read only memories (ROMs), etc. In one example, the core 1190 includes a microcode ROM (not shown) or other medium that stores microcode for certain macroinstructions (e.g., in decode circuitry 1140 or otherwise within the front end circuitry 1130). In one example, the decode circuitry 1140 includes a micro-operation (micro-op) or operation cache (not shown) to hold/cache decoded operations, micro-tags, or micro-operations generated during the decode or other stages of the processor pipeline 1100. The decode circuitry 1140 may be coupled to rename/allocator unit circuitry 1152 in the execution engine circuitry 1150.

The execution engine circuitry 1150 includes the rename/allocator unit circuitry 1152 coupled to a retirement unit circuitry 1154 and a set of one or more scheduler(s) circuitry 1156. The scheduler(s) circuitry 1156 represents any number of different schedulers, including reservations stations, central instruction window, etc. In some examples, the scheduler(s) circuitry 1156 can include arithmetic logic unit (ALU) scheduler/scheduling circuitry, ALU queues, arithmetic generation unit (AGU) scheduler/scheduling circuitry, AGU queues, etc. The scheduler(s) circuitry 1156 is coupled to the physical register file(s) circuitry 1158. Each of the physical register file(s) circuitry 1158 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1158 includes vector registers unit circuitry, writemask registers unit circuitry, and scalar register unit circuitry. These register units may provide architectural vector registers, vector mask registers, general-purpose registers, etc. The physical register file(s) circuitry 1158 is coupled to the retirement unit circuitry 1154 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1154 and the physical register file(s) circuitry 1158 are coupled to the execution cluster(s) 1160. The execution cluster(s) 1160 includes a set of one or more execution unit(s) circuitry 1162 and a set of one or more memory access circuitry 1164. The execution unit(s) circuitry 1162 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1156, physical register file(s) circuitry 1158, and execution cluster(s) 1160 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1164). It should also be understood that where separate pipelines are used, one or more of these pipelines may be out-of-order issue/execution and the rest in-order.

In some examples, the execution engine unit circuitry 1150 may perform load store unit (LSU) address/data pipelining to an Advanced Microcontroller Bus (AMB) interface (not shown), and address phase and writeback, data phase load, store, and branches.

The set of memory access circuitry 1164 is coupled to the memory unit circuitry 1170, which includes data TLB circuitry 1172 coupled to a data cache circuitry 1174 coupled to a level 2 (L2) cache circuitry 1176. In one exemplary example, the memory access circuitry 1164 may include a load unit circuitry, a store address unit circuit, and a store data unit circuitry, each of which is coupled to the data TLB circuitry 1172 in the memory unit circuitry 1170. The instruction cache circuitry 1134 is further coupled to the level 2 (L2) cache circuitry 1176 in the memory unit circuitry 1170. In one example, the instruction cache 1134 and the data cache 1174 are combined into a single instruction and data cache (not shown) in L2 cache circuitry 1176, a level 3 (L3) cache circuitry (not shown), and/or main memory. The L2 cache circuitry 1176 is coupled to one or more other levels of cache and eventually to a main memory.

The core 1190 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1190 includes logic to support a packed data instruction set architecture extension (e.g., AVX1, AVX2), thereby allowing the operations used by many multimedia applications to be performed using packed data.

Exemplary Execution Unit(s) Circuitry

Figure 12:
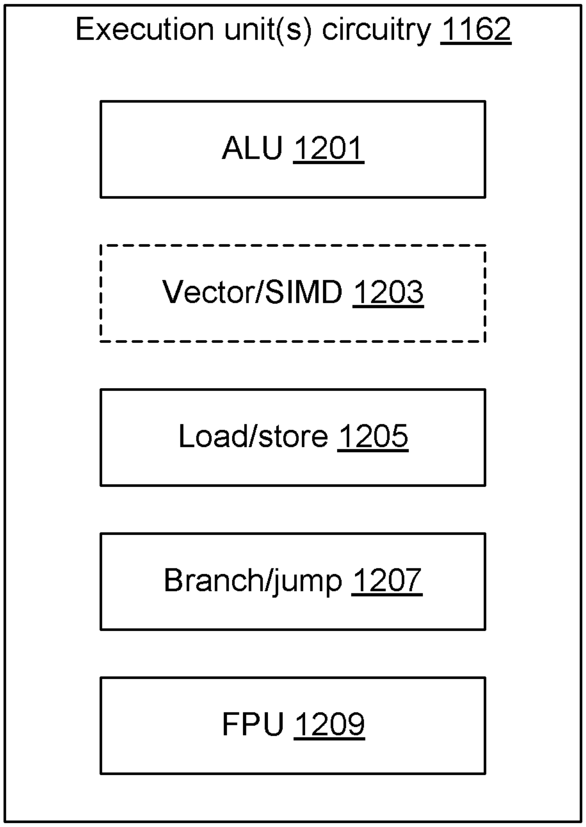
FIG. 12 illustrates examples of execution unit(s) circuitry.

FIG. 12 illustrates examples of execution unit(s) circuitry, such as execution unit(s) circuitry 1162 of FIG. 11B. As illustrated, execution unit(s) circuitry 1162 may include one or more ALU circuits 1201, optional vector/single instruction multiple data (SIMD) circuits 1203, load/store circuits 1205, branch/jump circuits 1207, and/or Floating-point unit (FPU) circuits 1209. ALU circuits 1201 perform integer arithmetic and/or Boolean operations. Vector/SIMD circuits 1203 perform vector/SIMD operations on packed data (such as SIMD/vector registers). Load/store circuits 1205 execute load and store instructions to load data from memory into registers or store from registers to memory. Load/store circuits 1205 may also generate addresses. Branch/jump circuits 1207 cause a branch or jump to a memory address depending on the instruction. FPU circuits 1209 perform floating-point arithmetic. The width of the execution unit(s) circuitry 1162 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Exemplary Register Architecture

Figure 13:
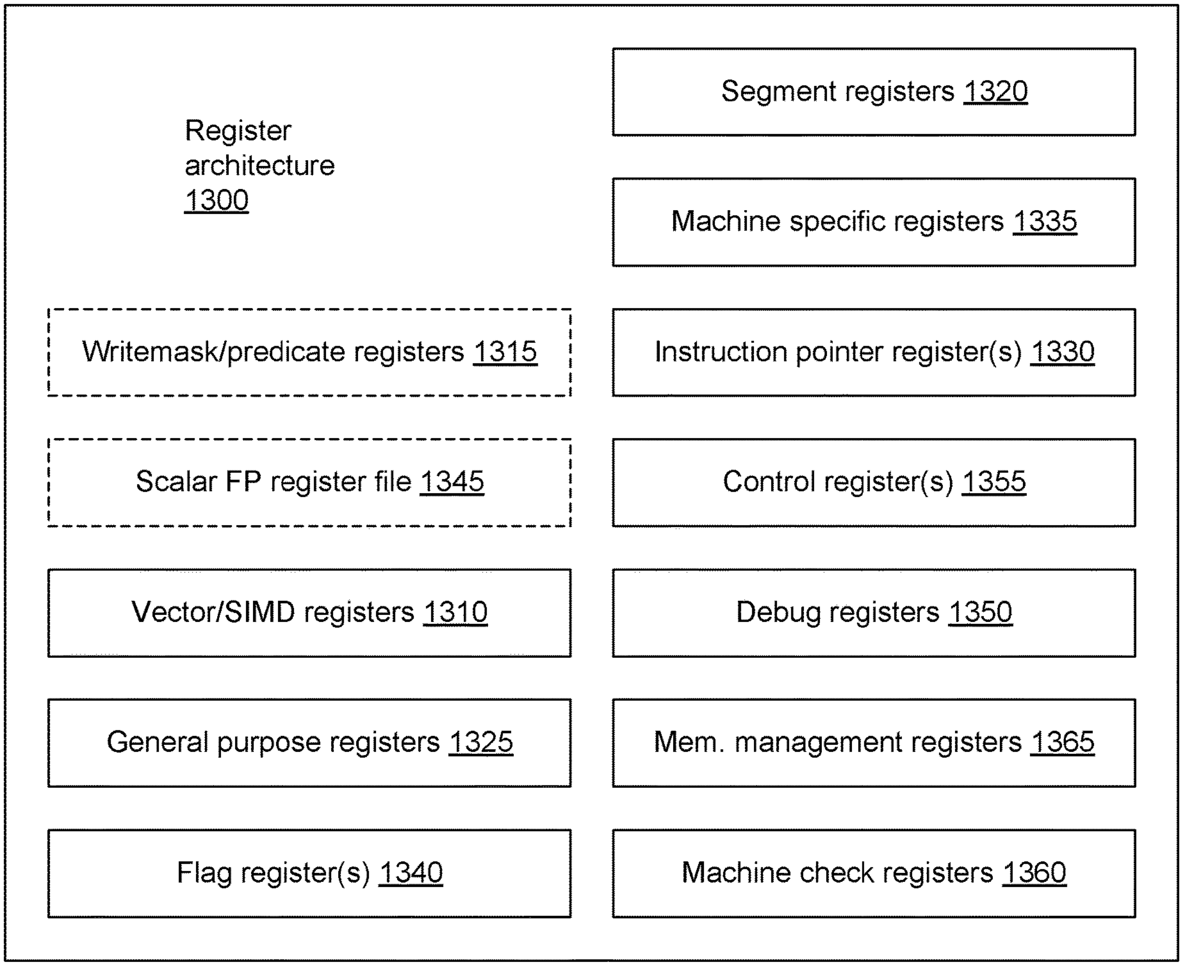
FIG. 13 is a block diagram of a register architecture according to some examples.

FIG. 13 is a block diagram of a register architecture 1300 according to some examples. As illustrated, the register architecture 1300 includes vector/SIMD registers 1310 that vary from 128-bit to 1,024 bits width. In some examples, the vector/SIMD registers 1310 are physically 512-bits and, depending upon the mapping, only some of the lower bits are used. For example, in some examples, the vector/SIMD registers 1310 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1300 includes writemask/predicate registers 1315. For example, in some examples, there are 8 writemask/predicate registers (sometimes called k0 through k7) that are each 16-bit, 32-bit, 64-bit, or 128-bit in size. Writemask/predicate registers 1315 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1315 corresponds to a data element position of the destination. In other examples, the writemask/predicate registers 1315 are scalable and consists of a set number of enable bits for a given vector element (e.g., 8 enable bits per 64-bit vector element).

The register architecture 1300 includes a plurality of general-purpose registers 1325. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1300 includes scalar floating-point (FP) register 1345 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1340 (e.g., EFLAGS, RFLAGS, etc.) store status and control information for arithmetic, compare, and system operations. For example, the one or more flag registers 1340 may store condition code information such as carry, parity, auxiliary carry, zero, sign, and overflow. In some examples, the one or more flag registers 1340 are called program status and control registers.

Segment registers 1320 contain segment points for use in accessing memory. In some examples, these registers are referenced by the names CS, DS, SS, ES, FS, and GS.

Machine specific registers (MSRs) 1335 control and report on processor performance. Most MSRs 1335 handle system-related functions and are not accessible to an application program. Machine check registers 1360 consist of control, status, and error reporting MSRs that are used to detect and report on hardware errors.

One or more instruction pointer register(s) 1330 store an instruction pointer value. Control register(s) 1355 (e.g., CR0-CR4) determine the operating mode of a processor (e.g., processor 970, 980, 938, 915, and/or 1000) and the characteristics of a currently executing task. Debug registers 1350 control and allow for the monitoring of a processor or core's debugging operations.

Memory (mem) management registers 1365 specify the locations of data structures used in protected mode memory management. These registers may include a GDTR, IDRT, task register, and a LDTR register.

Alternative examples may use wider or narrower registers. Additionally, alternative examples may use more, less, or different register files and registers. The register architecture 1300 may, for example, be used in register file/memory 808, or physical register file(s) circuitry 11 58.

Instruction Set Architectures.

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Exemplary Instruction Formats

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

Figure 14:
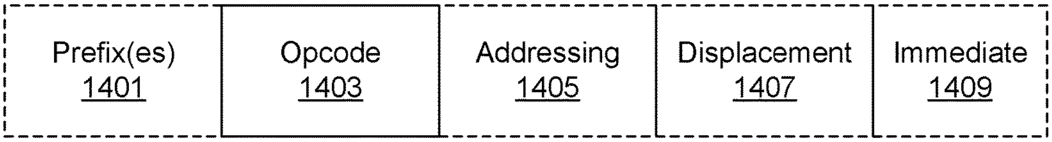
FIG. 14 illustrates examples of an instruction format.

FIG. 14 illustrates examples of an instruction format. As illustrated, an instruction may include multiple components including, but not limited to, one or more fields for: one or more prefixes 1401, an opcode 1403, addressing information 1405 (e.g., register identifiers, memory addressing information, etc.), a displacement value 1407, and/or an immediate value 1409. Note that some instructions utilize some or all of the fields of the format whereas others may only use the field for the opcode 1403. In some examples, the order illustrated is the order in which these fields are to be encoded, however, it should be appreciated that in other examples these fields may be encoded in a different order, combined, etc.

The prefix(es) field(s) 1401, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1403 is used to at least partially define the operation to be performed upon a decoding of the instruction. In some examples, a primary opcode encoded in the opcode field 1403 is one, two, or three bytes in length. In other examples, a primary opcode can be a different length. An additional 3-bit opcode field is sometimes encoded in another field.

Figure 15:
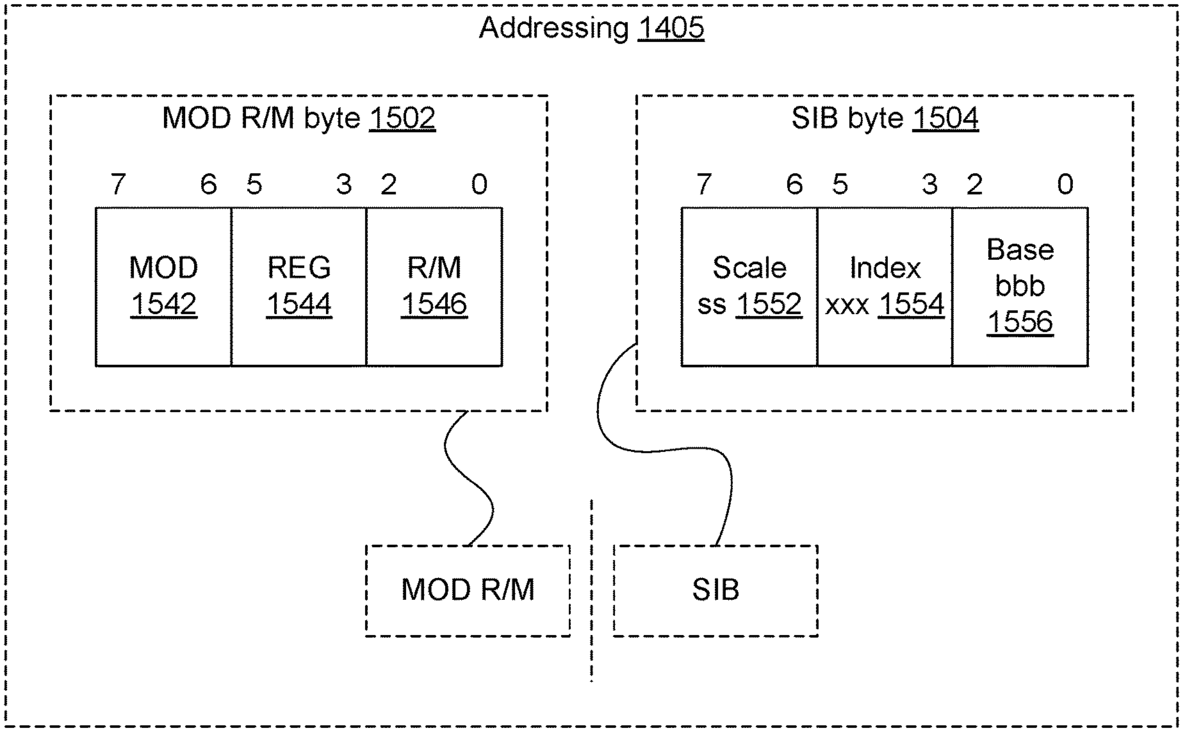
FIG. 15 illustrates examples of an addressing field.

The addressing field 1405 is used to address one or more operands of the instruction, such as a location in memory or one or more registers. FIG. 15 illustrates examples of the addressing field 1405. In this illustration, an optional ModR/M byte 1502 and an optional Scale, Index, Base (SIB) byte 1504 are shown. The ModR/M byte 1502 and the SIB byte 1504 are used to encode up to two operands of an instruction, each of which is a direct register or effective memory address. Note that each of these fields are optional in that not all instructions include one or more of these fields. The MOD R/M byte 1502 includes a MOD field 1542, a register (reg) field 1544, and R/M field 1546.

The content of the MOD field 1542 distinguishes between memory access and non-memory access modes. In some examples, when the MOD field 1542 has a binary value of 11 (11b), a register-direct addressing mode is utilized, and otherwise register-indirect addressing is used.

The register field 1544 may encode either the destination register operand or a source register operand, or may encode an opcode extension and not be used to encode any instruction operand. The content of register index field 1544, directly or through address generation, specifies the locations of a source or destination operand (either in a register or in memory). In some examples, the register field 1544 is supplemented with an additional bit from a prefix (e.g., prefix 1401) to allow for greater addressing.

The R/M field 1546 may be used to encode an instruction operand that references a memory address or may be used to encode either the destination register operand or a source register operand. Note the R/M field 1546 may be combined with the MOD field 1542 to dictate an addressing mode in some examples.

The SIB byte 1504 includes a scale field 1552, an index field 1554, and a base field 1556 to be used in the generation of an address. The scale field 1552 indicates scaling factor. The index field 1554 specifies an index register to use. In some examples, the index field 1554 is supplemented with an additional bit from a prefix (e.g., prefix 1401) to allow for greater addressing. The base field 1556 specifies a base register to use. In some examples, the base field 1556 is supplemented with an additional bit from a prefix (e.g., prefix 1401) to allow for greater addressing. In practice, the content of the scale field 1552 allows for the scaling of the content of the index field 1554 for memory address generation (e.g., for address generation that uses 2scale*index+base).

Some addressing forms utilize a displacement value to generate a memory address. For example, a memory address may be generated according to 2scale*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, a displacement 1407 provides this value. Additionally, in some examples, a displacement factor usage is encoded in the MOD field of the addressing field 1405 that indicates a compressed displacement scheme for which a displacement value is calculated and stored in the displacement field 1407.

In some examples, an immediate field 1409 specifies an immediate value for the instruction. An immediate value may be encoded as a 1-byte value, a 2-byte value, a 4-byte value, etc.

Figure 16:
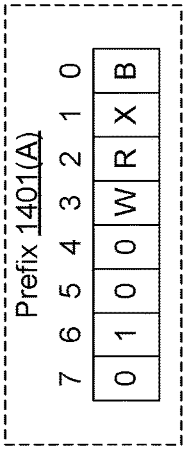
FIG. 16 illustrates examples of a first prefix.

FIG. 16 illustrates examples of a first prefix 1401(A). In some examples, the first prefix 1401(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1401(A) may specify up to three registers using 3-bit fields depending on the format: 1) using the reg field 1544 and the R/M field 1546 of the Mod R/M byte 1502; 2) using the Mod R/M byte 1502 with the SIB byte 1504 including using the reg field 1544 and the base field 1556 and index field 1554; or 3) using the register field of an opcode.

In the first prefix 1401(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 (24) registers to be addressed, whereas the MOD R/M reg field 1544 and MOD R/M R/M field 1546 alone can each only address 8 registers.

In the first prefix 1401(A), bit position 2 (R) may be an extension of the MOD R/M reg field 1544 and may be used to modify the ModR/M reg field 1544 when that field encodes a general-purpose register, a 64-bit packed data register (e.g., a SSE register), or a control or debug register. R is ignored when Mod R/M byte 1502 specifies other registers or defines an extended opcode.

Bit position 1 (X) may modify the SIB byte index field 1554.

Bit position 0 (B) may modify the base in the Mod R/M R/M field 1546 or the SIB byte base field 1556; or it may modify the opcode register field used for accessing general purpose registers (e.g., general purpose registers 1325).

Figure 17A:
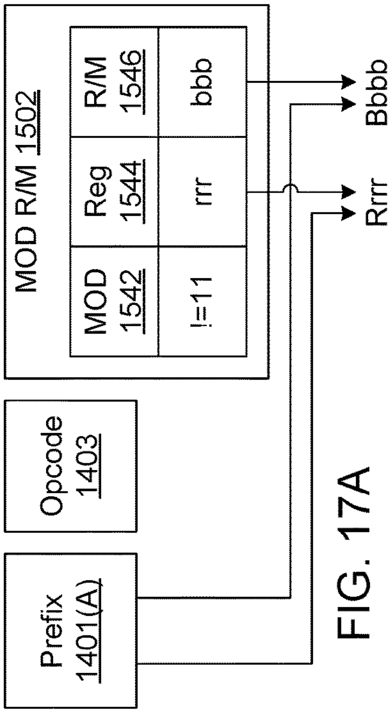
FIGS. 17A-D illustrate examples of how the R, X, and B fields of the first prefix in FIG. 16 are used.
Figure 17B:
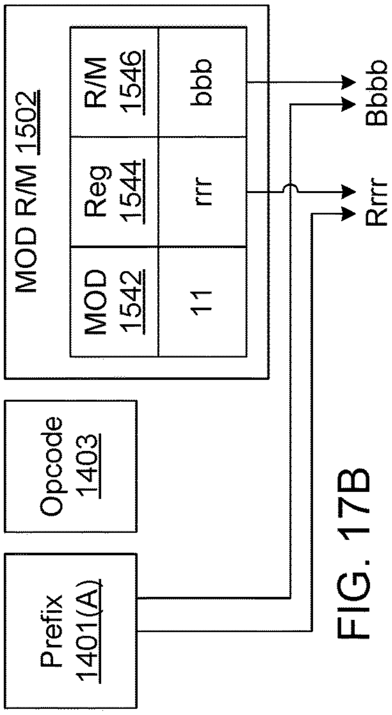
Figure 17C:
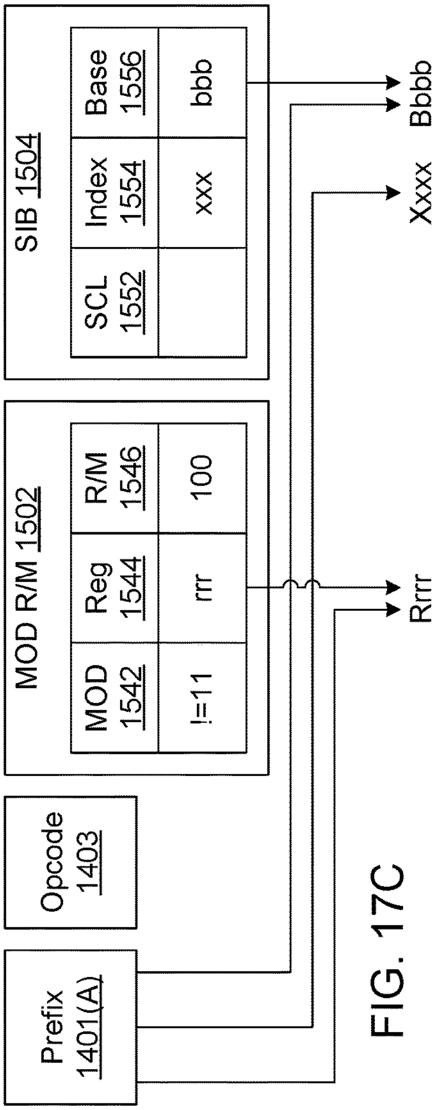
Figure 17D:
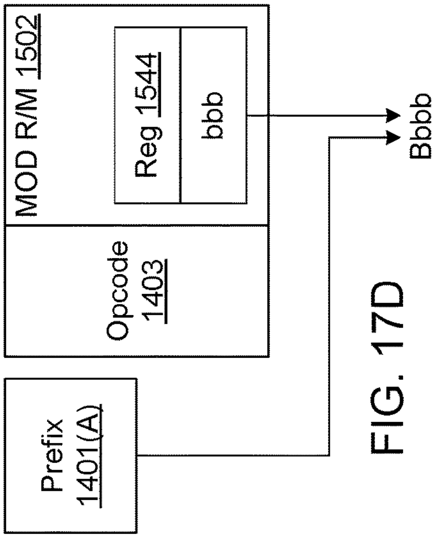

FIGS. 17A-D illustrate examples of how the R, X, and B fields of the first prefix 1401(A) are used. FIG. 17A illustrates R and B from the first prefix 1401(A) being used to extend the reg field 1544 and R/M field 1546 of the MOD R/M byte 1502 when the SIB byte 15 04 is not used for memory addressing. FIG. 17B illustrates R and B from the first prefix 1401(A) being used to extend the reg field 1544 and R/M field 1546 of the MOD R/M byte 1502 when the SIB byte 15 04 is not used (register-register addressing). FIG. 17C illustrates R, X, and B from the first prefix 1401(A) being used to extend the reg field 1544 of the MOD R/M byte 1502 and the index field 1554 and base field 1556 when the SIB byte 15 04 being used for memory addressing. FIG. 17D illustrates B from the first prefix 1401(A) being used to extend the reg field 1544 of the MOD R/M byte 1502 when a register is encoded in the opcode 1403.

Figure 18A:
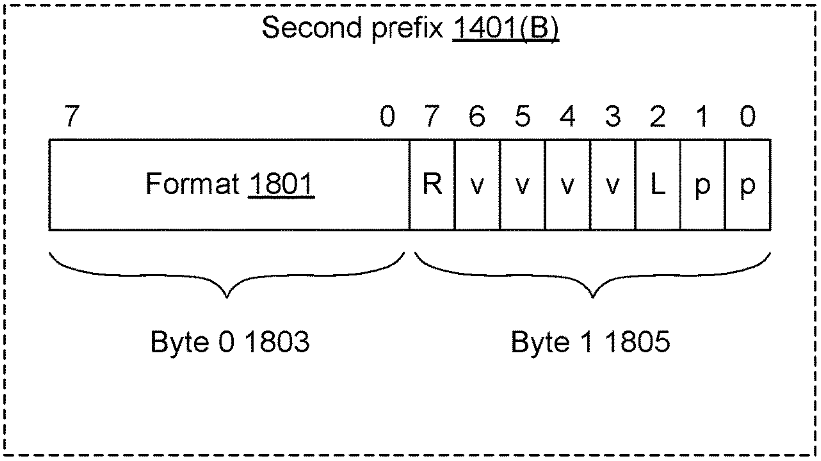
FIGS. 18A-B illustrate examples of a second prefix.
Figure 18B:
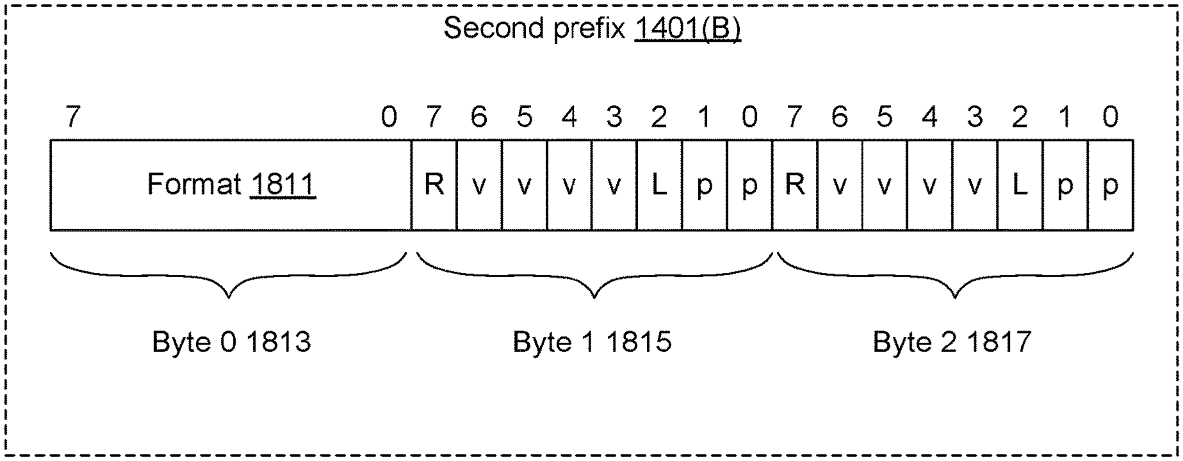

FIGS. 18A-B illustrate examples of a second prefix 1401 (B). In some examples, the second prefix 1401(B) is an example of a VEX prefix. The second prefix 1401(B) encoding allows instructions to have more than two operands, and allows SIMD vector registers (e.g., vector/SIMD registers 1310) to be longer than 64-bits (e.g., 128-bit and 256-bit). The use of the second prefix 1401(B) provides for three-operand (or more) syntax. For example, previous two-operand instructions performed operations such as A=A+B, which overwrites a source operand. The use of the second prefix 1401(B) enables operands to perform nondestructive operations such as A=B+C.

In some examples, the second prefix 1401(B) comes in two forms—a two-byte form and a three-byte form. The two-byte second prefix 1401(B) is used mainly for 128-bit, scalar, and some 256-bit instructions; while the three-byte second prefix 1401(B) provides a compact replacement of the first prefix 1401(A) and 3-byte opcode instructions.

FIG. 18A illustrates examples of a two-byte form of the second prefix 1401(B). In one example, a format field 1801 (byte 0 1803) contains the value C5H. In one example, byte 1 1805 includes a "R" value in bit[7]. This value is the complement of the "R" value of the first prefix 1401(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1546 to encode the instruction operand that references a memory address or encode either the destination register operand or a source register operand.

Instructions that use this prefix may use the Mod R/M reg field 1544 to encode either the destination register operand or a source register operand, be treated as an opcode extension and not used to encode any instruction operand.

For instruction syntax that support four operands, vvvv, the Mod R/M R/M field 1546 and the Mod R/M reg field 1544 encode three of the four operands. Bits[7:4] of the immediate 1409 are then used to encode the third source register operand.

FIG. 18B illustrates examples of a three-byte form of the second prefix 1401(B). In one example, a format field 1811 (byte 0 1813) contains the value C4H. Byte 1 1815 includes in bits[7:5] "R," "X," and "B" which are the complements of the same values of the first prefix 1401(A). Bits[4:0] of byte 1 1815 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1817 is used similar to W of the first prefix 1401(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1546 to encode the instruction operand that references a memory address or encode either the destination register operand or a source register operand.

Instructions that use this prefix may use the Mod R/M reg field 1544 to encode either the destination register operand or a source register operand, be treated as an opcode extension and not used to encode any instruction operand.

For instruction syntax that support four operands, vvvv, the Mod R/M R/M field 1546, and the Mod R/M reg field 1544 encode three of the four operands. Bits[7:4] of the immediate 1409 are then used to encode the third source register operand.

Figure 19:
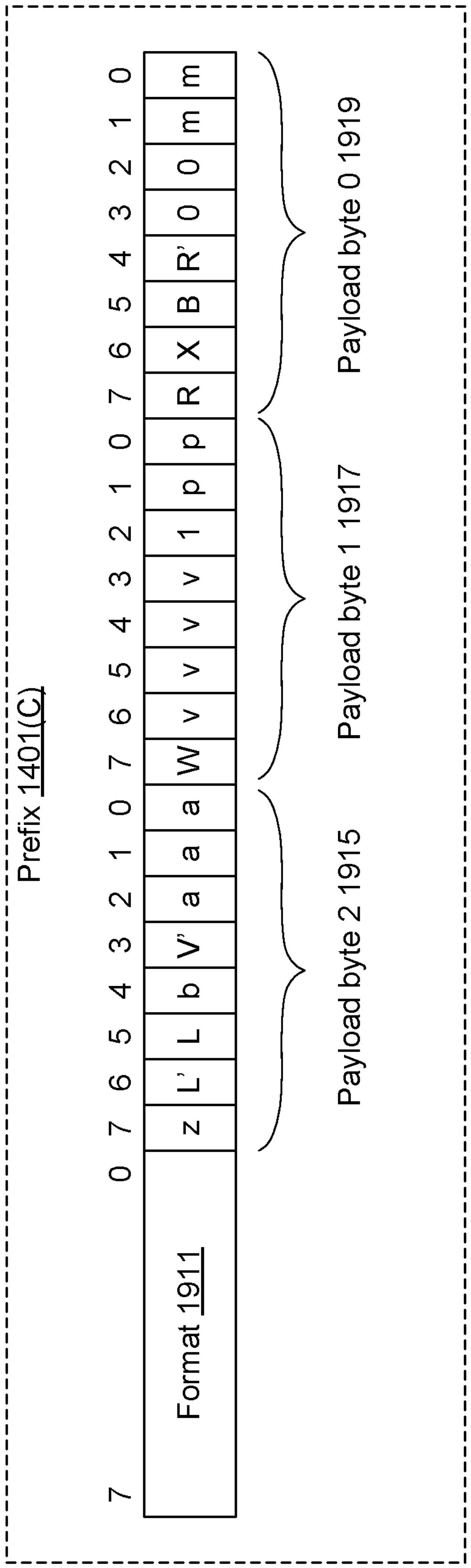
FIG. 19 illustrates examples of a third prefix.

FIG. 19 illustrates examples of a third prefix 1401(C). In some examples, the first prefix 1401(A) is an example of an EVEX prefix. The third prefix 1401(C) is a four-byte prefix.

The third prefix 1401(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 13) or predication utilize this prefix. Opmask register allow for conditional processing or selection control. Opmask instructions, whose source/destination operands are opmask registers and treat the content of an opmask register as a single value, are encoded using the second prefix 1401(B).

The third prefix 1401(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1401(C) is a format field 1911 that has a value, in one example, of 62H. Subsequent bytes are referred to as payload bytes 1915-1919 and collectively form a 24-bit value of P[23:0] providing specific capability in the form of one or more fields (detailed herein).

In some examples, P[1:0] of payload byte 1919 are identical to the low two mmmmm bits. P[3:2] are reserved in some examples. Bit P[4] (R') allows access to the high 16 vector register set when combined with P[7] and the ModR/M reg field 1544. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1544 and ModR/M R/M field 1546. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1401(A) and second prefix 1401(B) and may serve as an opcode extension bit or operand size promotion.

P[18:16] specify the index of a register in the opmask (writemask) registers (e.g., writemask/predicate registers 1315). In one example, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary examples of encoding of registers in instructions using the third prefix 1401(C) are detailed in the following tables.

TABLE 1

32-Register Support in 64-bit Mode

| | 4 | 3 | [2:0] | REG. TYPE | COMMON USAGES |
|---|---|---|---|---|---|
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | vvvv | GPR, Vector | 2nd Source or Destination |
| RM | ModR/M R/M | GPR, Vector | 1st Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | 2nd Source |
| RM | ModR/M R/M | k0-k7 | 1st Source |
| {k1] | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, Etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 20:
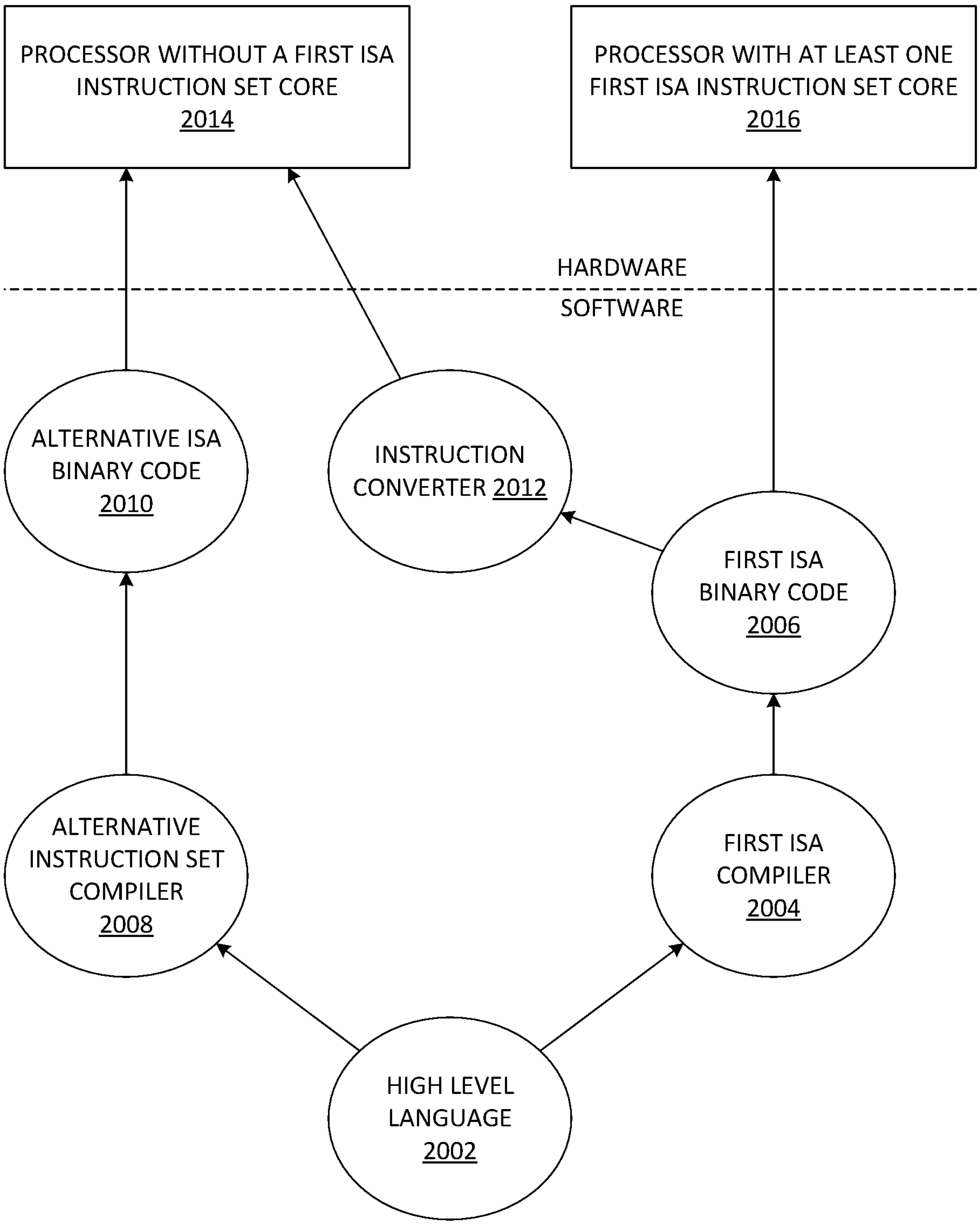
FIG. 20 is a block diagram illustrating the use of a software instruction converter to convert binary instructions in a source instruction set architecture to binary instructions in a target instruction set architecture according to examples.

FIG. 20 illustrates a block diagram contrasting the use of a software instruction converter to convert binary instructions in a source instruction set architecture to binary instructions in a target instruction set architecture according to examples. In the illustrated example, the instruction converter is a software instruction converter, although alternatively the instruction converter may be implemented in software, firmware, hardware, or various combinations thereof. FIG. 20 shows a program in a high-level language 2002 may be compiled using a first ISA compiler 2004 to generate first ISA binary code 2006 that may be natively executed by a processor with at least one first instruction set architecture core 2016. The processor with at least one first ISA instruction set architecture core 2016 represents any processor that can perform substantially the same functions as an Intel® processor with at least one first ISA instruction set architecture core by compatibly executing or otherwise processing (1) a substantial portion of the instruction set architecture of the first ISA instruction set architecture core or (2) object code versions of applications or other software targeted to run on an Intel processor with at least one first ISA instruction set architecture core, in order to achieve substantially the same result as a processor with at least one first ISA instruction set architecture core. The first ISA compiler 2004 represents a compiler that is operable to generate first ISA binary code 2006 (e.g., object code) that can, with or without additional linkage processing, be executed on the processor with at least one first ISA instruction set architecture core 2016. Similarly, FIG. 20 shows the program in the high-level language 2002 may be compiled using an alternative instruction set architecture compiler 2008 to generate alternative instruction set architecture binary code 2010 that may be natively executed by a processor without a first ISA instruction set architecture core 2014. The instruction converter 2012 is used to convert the first ISA binary code 2006 into code that may be natively executed by the processor without a first ISA instruction set architecture core 2014. This converted code is not necessarily to be the same as the alternative instruction set architecture binary code 2010; however, the converted code will accomplish the general operation and be made up of instructions from the alternative instruction set architecture. Thus, the instruction converter 2012 represents software, firmware, hardware, or a combination thereof that, through emulation, simulation or any other process, allows a processor or other electronic device that does not have a first ISA instruction set architecture processor or core to execute the first ISA binary code 2006.

In one or more first embodiments, a processor core comprises a decoder circuit to decode an instruction to enable a first hardware (HW) thread of a processor core to access a trusted execution environment (TEE), wherein the decoder circuit is to generate a decoded instruction, and an execution circuit to execute the decoded instruction with the processor core, comprising the execution circuit to perform an evaluation to determine whether, for each other HW thread of the processor core which is currently in an active state, the other HW thread is currently authorized to access the TEE, and the execution circuit to generate a signal, based on the evaluation, to indicate whether the first HW thread is authorized to access the TEE.

In one or more second embodiments, further to the first embodiment, the execution circuit to perform the evaluation comprises the execution circuit to make a first determination as to whether, after an expiration of a threshold period of time, any active HW thread which is a sibling of the first HW thread is unable to access the TEE.

In one or more third embodiments, further to the first embodiment or the second embodiment, the signal is to enable an entry of the first HW thread into the TEE using a respective hardware-reserved thread state.

In one or more fourth embodiments, further to the third embodiment, the signal is a first signal, and wherein the execution circuit to execute the decoded instruction with the processor core further comprises the execution circuit to generate a second signal, based on the evaluation, to wake up another HW thread of the processor core, wherein the other HW thread is to enter into the TEE using a respective hardware-reserved thread state.

In one or more fifth embodiments, further to any of the first through third embodiments, the instruction is a first instruction, the decoded instruction is a first decoded instruction, and the signal is a first signal which is to indicate that the first HW thread is approved to access the TEE, and wherein the decoder circuit is further to decode a second instruction to disable access to the TEE by the first HW thread, wherein the decoder circuit is to generate a second decoded instruction, the execution circuit is further to execute the second decoded instruction to exit the first HW thread from the TEE, and to generate a second signal which is to indicate, to a software process, an opportunity to wake up one or more other HW threads of the processor core.

In one or more sixth embodiments, further to any of the first through third embodiments, the execution circuit to execute the second decoded instruction further comprises the execution circuit to make a first determination that one or more other HW threads of the processor core are active in the TEE, make a second determination that an execution by the first HW thread is expected to continue outside of the TEE, and based on the first determination and the second determination, generate a third signal to force the one or more other HW threads to exit the TEE.

In one or more seventh embodiments, further to any of the first through third embodiments, the evaluation is a first evaluation, and wherein the signal is a first signal, the processor core further comprises circuitry to detect a transition to an awake state by a second HW thread of the processor core, the transition while the first HW thread is in the TEE, based on the transition, perform a second evaluation to determine whether the second HW thread is to execute in the TEE, and based on the second evaluation, generate a second signal to exit the first HW thread from the TEE.

In one or more eighth embodiments, further to any of the first through third embodiments, the signal is a first signal, the processor core further comprising circuitry to detect an attempt to transition a second HW thread of the processor core to an awake state, detect a coincidence of the attempt with an execution by the first HW thread in the TEE, and based on the coincidence, generate a second signal to prevent the transition.

In one or more ninth embodiments, further to the eighth embodiment, the processor core further comprises circuitry to generate, based on the coincidence, a second signal which indicates, to a software process, that the transition is prevented.

In one or more tenth embodiments, a method at a processor comprises fetching an instruction which is to enable a first hardware (HW) thread of a processor core to access a trusted execution environment (TEE), decoding the instruction with the processor core to generate a decoded instruction, executing the decoded instruction with the processor core, comprising performing an evaluation to determine whether, for each other HW thread of the processor core which is currently in an active state, the other HW thread is currently authorized to access the TEE, and based on the evaluation, generating a signal to indicate whether the first HW thread is authorized to access the TEE.

In one or more eleventh embodiments, further to the tenth embodiment, performing the evaluation comprises making a first determination as to whether, after an expiration of a threshold period of time, any active HW thread which is a sibling of the first HW thread is unable to access the TEE.

In one or more twelfth embodiments, further to the tenth embodiment or the eleventh embodiment, the signal is to enable an entry of the first HW thread into the TEE using a respective hardware-reserved thread state.

In one or more thirteenth embodiments, further to the twelfth embodiment, the signal is a first signal, and wherein executing the decoded instruction with the processor core further comprises, based on the evaluation, generating a second signal to wake up another HW thread of the processor core, wherein the other HW thread is to enter into the TEE using a respective hardware-reserved thread state.

In one or more fourteenth embodiments, further to any of the tenth through twelfth embodiments, the instruction is a first instruction, the decoded instruction is a first decoded instruction, and the signal is a first signal which is to indicate that the first HW thread is approved to access the TEE, the method further comprising fetching a second instruction to disable access to the TEE by the first HW thread, decoding the second instruction with the processor core to generate a second decoded instruction, executing the second decoded instruction with the processor core to exit the first HW thread from the TEE, and to generate a second signal which indicates, to a software process, an opportunity to wake up one or more other HW threads of the processor core.

In one or more fifteenth embodiments, further to any of the tenth through twelfth embodiments, executing the second decoded instruction further comprises making a first determination that one or more other HW threads of the processor core are active in the TEE, making a second determination that an execution by the first HW thread is expected to continue outside of the TEE, and based on the first determination and the second determination, generating a third signal to force the one or more other HW threads to exit the TEE.

In one or more sixteenth embodiments, further to any of the tenth through twelfth embodiments, the evaluation is a first evaluation, and wherein the signal is a first signal, the method further comprising detecting a transition to an awake state by a second HW thread of the processor core, the transition while the first HW thread is in the TEE, based on the transition, performing a second evaluation to determine whether the second HW thread is to execute in the TEE, and based on the second evaluation, generating a second signal to exit the first HW thread from the TEE.

In one or more seventeenth embodiments, further to any of the tenth through twelfth embodiments, the signal is a first signal, the method further comprising detecting an attempt to transition a second HW thread of the processor core to an awake state, detecting a coincidence of the attempt with an execution by the first HW thread in the TEE, and based on the coincidence, generating a second signal to prevent the transition.

In one or more eighteenth embodiments, further to the seventeenth embodiment, the method further comprises based on the coincidence, generating a second signal which indicates, to a software process, that the transition is prevented.

In one or more nineteenth embodiments, a system comprises a processor comprising a processor core comprising a decoder circuit to decode an instruction to enable a first hardware (HW) thread of a processor core to access a trusted execution environment (TEE), wherein the decoder circuit is to generate a decoded instruction, and an execution circuit to execute the decoded instruction with the processor core, comprising the execution circuit to perform an evaluation to determine whether, for each other HW thread of the processor core which is currently in an active state, the other HW thread is currently authorized to access the TEE, and the execution circuit to generate a signal, based on the evaluation, to indicate whether the first HW thread is authorized to access the TEE, a circuit board coupled to the processor, and a memory coupled to participate in communication with the processor via the circuit board.

In one or more twentieth embodiments, further to the nineteenth embodiment, the execution circuit to perform the evaluation comprises the execution circuit to make a first determination as to whether, after an expiration of a threshold period of time, any active HW thread which is a sibling of the first HW thread is unable to access the TEE.

In one or more twenty-first embodiments, further to the nineteenth embodiment or the twentieth embodiment, the signal is to enable an entry of the first HW thread into the TEE using a respective hardware-reserved thread state.

In one or more twenty-second embodiments, further to the twenty-first embodiment, the signal is a first signal, and wherein the execution circuit to execute the decoded instruction with the processor core further comprises the execution circuit to generate a second signal, based on the evaluation, to wake up another HW thread of the processor core, wherein the other HW thread is to enter into the TEE using a respective hardware-reserved thread state.

In one or more twenty-third embodiments, further to any of the nineteenth through twenty-first embodiments, the instruction is a first instruction, the decoded instruction is a first decoded instruction, and the signal is a first signal which is to indicate that the first HW thread is approved to access the TEE, and wherein the decoder circuit is further to decode a second instruction to disable access to the TEE by the first HW thread, wherein the decoder circuit is to generate a second decoded instruction, the execution circuit is further to execute the second decoded instruction to exit the first HW thread from the TEE, and to generate a second signal which is to indicate, to a software process, an opportunity to wake up one or more other HW threads of the processor core.

In one or more twenty-fourth embodiments, further to any of the nineteenth through twenty-first embodiments, the execution circuit to execute the second decoded instruction further comprises the execution circuit to make a first determination that one or more other HW threads of the processor core are active in the TEE, make a second determination that an execution by the first HW thread is expected to continue outside of the TEE, and based on the first determination and the second determination, generate a third signal to force the one or more other HW threads to exit the TEE.

In one or more twenty-fifth embodiments, further to any of the nineteenth through twenty-first embodiments, the evaluation is a first evaluation, and wherein the signal is a first signal, the processor core further comprises circuitry to detect a transition to an awake state by a second HW thread of the processor core, the transition while the first HW thread is in the TEE, based on the transition, perform a second evaluation to determine whether the second HW thread is to execute in the TEE, and based on the second evaluation, generate a second signal to exit the first HW thread from the TEE.

In one or more twenty-sixth embodiments, further to any of the nineteenth through twenty-first embodiments, the signal is a first signal, the processor core further comprising circuitry to detect an attempt to transition a second HW thread of the processor core to an awake state, detect a coincidence of the attempt with an execution by the first HW thread in the TEE, and based on the coincidence, generate a second signal to prevent the transition.

In one or more twenty-seventh embodiments, further to the twenty-sixth embodiment, the processor core further comprises circuitry to generate, based on the coincidence, a second signal which indicates, to a software process, that the transition is prevented.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A processor core comprising:

a decoder circuit to decode a first instruction to enable a first hardware (HW) thread of the processor core to access a trusted execution environment (TEE), wherein the decoder circuit is to generate a first decoded instruction; and an execution circuit to execute the first decoded instruction with the processor core, comprising:

the execution circuit to perform an evaluation to determine whether, for each other HW thread of the processor core which is currently in an active state, the other HW thread is currently authorized to access the TEE; and the execution circuit to generate a first signal, based on the evaluation, to indicate that the first HW thread is authorized to access the TEE;

wherein:

the decoder circuit is further to decode a second instruction to disable access to the TEE by the first HW thread, wherein the decoder circuit is to generate a second decoded instruction; and the execution circuit is further to execute the second decoded instruction to exit the first HW thread from the TEE, and to generate a second signal which is to indicate, to a software process, an opportunity to wake up one or more other HW threads of the processor core.

2. The processor core of claim 1, wherein the execution circuit to perform the evaluation comprises the execution circuit to make a first determination as to whether, after an expiration of a threshold period of time, any active HW thread which is a sibling of the first HW thread is unable to access the TEE.

3. The processor core of claim 1, wherein the first signal is to enable an entry of the first HW thread into the TEE using a respective hardware-reserved thread state.

4. The processor core of claim 3, wherein the execution circuit to execute the first decoded instruction with the processor core further comprises the execution circuit to generate a third signal, based on the evaluation, to wake up another HW thread of the processor core, wherein the other HW thread is to enter into the TEE using a respective hardware-reserved thread state.

5. The processor core of claim 1, wherein the execution circuit to execute the second decoded instruction further comprises the execution circuit to:
- make a first determination that one or more other HW threads of the processor core are active in the TEE;
- make a second determination that an execution by the first HW thread is expected to continue outside of the TEE; and
- based on the first determination and the second determination, generate a third signal to force the one or more other HW threads to exit the TEE.

6. The processor core of claim 1, wherein the evaluation is a first evaluation, and wherein the processor core further comprises circuitry to:
- detect a transition to an awake state by a second HW thread of the processor core, the transition while the first HW thread is in the TEE;
- based on the transition, perform a second evaluation to determine whether the second HW thread is to execute in the TEE; and
- based on the second evaluation, generate a third signal to exit the first HW thread from the TEE.

7. The processor core of claim 1, the processor core further comprising circuitry to:
- detect an attempt to transition a second HW thread of the processor core to an awake state;
- detect a coincidence of the attempt with an execution by the first HW thread in the TEE; and
- based on the coincidence, generate a third signal to prevent the transition.

8. The processor core of claim 7, further comprising circuitry to generate, based on the coincidence, a fourth signal which indicates, to a software process, that the transition is prevented.

9. A method at a processor, the method comprising:
- fetching a first instruction which is to enable a first hardware (HW) thread of a processor core to access a trusted execution environment (TEE);
- decoding the first instruction with the processor core to generate a first decoded instruction;
- executing the first decoded instruction with the processor core, comprising:
  - performing an evaluation to determine whether, for each other HW thread of the processor core which is currently in an active state, the other HW thread is currently authorized to access the TEE; and
  - based on the evaluation, generating a first signal to indicate that the first HW thread is authorized to access the TEE;
- fetching a second instruction to disable access to the TEE by the first HW thread;
- decoding the second instruction with the processor core to generate a second decoded instruction; and
- executing the second decoded instruction with the processor core to exit the first HW thread from the TEE, and to generate a second signal which indicates, to a software process, an opportunity to wake up one or more other HW threads of the processor core.

10. The method of claim 9, wherein performing the evaluation comprises making a first determination as to whether, after an expiration of a threshold period of time, any active HW thread which is a sibling of the first HW thread is unable to access the TEE.

11. The method of claim 9, wherein the first signal is to enable an entry of the first HW thread into the TEE using a respective hardware-reserved thread state.

12. The method of claim 11, wherein executing the first decoded instruction with the processor core further comprises, based on the evaluation, generating a third signal to wake up another HW thread of the processor core, wherein the other HW thread is to enter into the TEE using a respective hardware-reserved thread state.

13. The method of claim 9, wherein executing the second decoded instruction further comprises:
- making a first determination that one or more other HW threads of the processor core are active in the TEE;
- making a second determination that an execution by the first HW thread is expected to continue outside of the TEE; and
- based on the first determination and the second determination, generating a third signal to force the one or more other HW threads to exit the TEE.

14. A system comprising:
- a processor comprising:
  - a processor core comprising:
    - a decoder circuit to decode a first instruction to enable a first hardware (HW) thread of the processor core to access a trusted execution environment (TEE), wherein the decoder circuit is to generate a first decoded instruction; and
    - an execution circuit to execute the first decoded instruction with the processor core, comprising:
      - the execution circuit to perform an evaluation to determine whether, for each other HW thread of the processor core which is currently in an active state, the other HW thread is currently authorized to access the TEE; and
      - the execution circuit to generate a first signal, based on the evaluation, to indicate that the first HW thread is authorized to access the TEE;
- wherein:
  - the decoder circuit is further to decode a second instruction to disable access to the TEE by the first HW thread, wherein the decoder circuit is to generate a second decoded instruction; and
  - the execution circuit is further to execute the second decoded instruction to exit the first HW thread from the TEE, and to generate a second signal which is to indicate, to a software process, an opportunity to wake up one or more other HW threads of the processor core;
- a circuit board coupled to the processor; and
- a memory coupled to participate in communication with the processor via the circuit board.

15. The system of claim 14, wherein the execution circuit to perform the evaluation comprises the execution circuit to make a first determination as to whether, after an expiration of a threshold period of time, any active HW thread which is a sibling of the first HW thread is unable to access the TEE.

16. The system of claim 14, wherein the first signal is to enable an entry of the first HW thread into the TEE using a respective hardware-reserved thread state.

17. The system of claim 16, wherein the execution circuit to execute the first decoded instruction with the processor core further comprises the execution circuit to generate a third signal, based on the evaluation, to wake up another HW thread of the processor core, wherein the other HW thread is to enter into the TEE using a respective hardware-reserved thread state.

* * * * *